(12) United States Patent
Strand

(10) Patent No.: US 11,813,909 B2
(45) Date of Patent: Nov. 14, 2023

(54) TRAILER COUPLING ASSEMBLY AND VEHICLE WITH TRAILER COUPLING ASSEMBLY

(71) Applicant: Smart Patents AS, Sandvika (NO)

(72) Inventor: Dag Arild Aamodt Strand, Jakobsli (NO)

(73) Assignee: Smart Patents AS, Sandvika (NO)

( * ) Notice: Subject to any disclaimer, the term of this patent is extended or adjusted under 35 U.S.C. 154(b) by 0 days.

(21) Appl. No.: 17/916,575

(22) PCT Filed: May 28, 2021

(86) PCT No.: PCT/NO2021/050138
§ 371 (c)(1),
(2) Date: Oct. 2, 2022

(87) PCT Pub. No.: WO2021/242118
PCT Pub. Date: Dec. 2, 2021

(65) Prior Publication Data
US 2023/0132205 A1   Apr. 27, 2023

(30) Foreign Application Priority Data
May 29, 2020   (NO) .................................. 20200637

(51) Int. Cl.
*B60D 1/00* (2006.01)
*B60D 1/54* (2006.01)
(Continued)

(52) U.S. Cl.
CPC .................. *B60D 1/54* (2013.01); *B60D 1/06* (2013.01); *B60D 1/36* (2013.01); *B60D 1/62* (2013.01)

(58) Field of Classification Search
CPC ... B60D 1/54; B60D 1/06; B60D 1/36; B60D 1/62
(Continued)

(56) References Cited

U.S. PATENT DOCUMENTS 4,991,865 A     2/1991 Francisco
5,356,167 A *  10/1994 Hall ........................ B60D 1/48
                                                                    280/901
(Continued)

FOREIGN PATENT DOCUMENTS

DE        19922770 A1    12/2000
DE        10004523 A1     8/2001
(Continued)

OTHER PUBLICATIONS

International Search Report and Written Opinion dated Sep. 1, 2021 for International Patent Application No. PCT/NO2021/050138.
(Continued)

*Primary Examiner* — Tyler J Lee
*Assistant Examiner* — Tiffany P Ohman
(74) *Attorney, Agent, or Firm* — Alix, Yale & Ristas, LLP

(57) ABSTRACT

Trailer coupling assembly arranged to a support structure of a vehicle or support structure of a trailer, wherein the trailer coupling assembly comprises a tow bar or a connection head/trailer hitch, wherein it comprises an intermediate connection device enabling movement of the tow bar or connection head/trailer hitch in a vertical direction and/or longitudinal direction of the vehicle or trailer, respectively. A vehicle with trailer coupling assembly movable in at least a vertical direction and/or longitudinal direction of the vehicle.

15 Claims, 13 Drawing Sheets

(51) Int. Cl.
*B60D 1/06* (2006.01)
*B60D 1/36* (2006.01)
*B60D 1/62* (2006.01)

(58) Field of Classification Search
USPC .......................................................... 701/49
See application file for complete search history.

(56) References Cited

U.S. PATENT DOCUMENTS

| | | | |
|---|---|---|---|
| 6,000,709 | A | 12/1999 | Gentner et al. |
| 6,164,681 | A | 12/2000 | Grammer |
| 8,091,913 | B1 | 1/2012 | White |
| 9,834,049 | B2 | 12/2017 | Strand |
| 9,840,120 | B1 | 12/2017 | Alhazza et al. |
| 2002/0125018 | A1 | 9/2002 | Bernhardt et al. |
| 2004/0021292 | A1* | 2/2004 | Abair ................... B60D 1/246 280/456.1 |
| 2005/0167945 | A1 | 8/2005 | Rimmelspacher et al. |
| 2006/0290100 | A1 | 12/2006 | Miller |
| 2007/0007749 | A1 | 1/2007 | Gentner et al. |
| 2009/0236825 | A1 | 9/2009 | Okuda et al. |
| 2010/0096203 | A1 | 4/2010 | Freese, V et al. |
| 2013/0226390 | A1 | 8/2013 | Luo et al. |
| 2016/0185169 | A1* | 6/2016 | Strand ..................... B60D 1/36 280/479.1 |
| 2018/0050573 | A1* | 2/2018 | Strand ................... B60D 1/246 |
| 2018/0126811 | A1* | 5/2018 | Shaffer .................... B60D 1/46 |
| 2021/0053568 | A1* | 2/2021 | Niewiadomski ...... B60W 10/18 |

FOREIGN PATENT DOCUMENTS

| | | | |
|---|---|---|---|
| DE | 102010004920 | A1 | 7/2011 |
| EP | 1535765 | B1 | 4/2006 |
| EP | 2602132 | A1 | 6/2013 |
| GB | 2513393 | A | 10/2014 |
| WO | WO-0183242 | A1 * | 11/2001 ............ B60D 1/155 |
| WO | 2013064992 | A1 | 5/2013 |
| WO | 2016070245 | A1 | 5/2016 |
| WO | 2020023894 | A1 | 1/2020 |

OTHER PUBLICATIONS

Search Report dated Dec. 27, 2020 for Norwegian Patent Application No. 20200637.

Office Action dated Mar. 30, 2022 for Norwegian Patent Application No. 20200637.

Approval for Grant of Patent dated Sep. 28, 2022 for Norwegian Patent Application No. 20200637.

* cited by examiner

TRAILER COUPLING ASSEMBLY AND VEHICLE WITH TRAILER COUPLING ASSEMBLY

BACKGROUND

The disclosed embodiments are related to a trailer coupling assembly and to a vehicle with trailer coupling assembly.

More particularly, the embodiments are related to a trailer coupling assembly and vehicle with trailer coupling assembly, enabling connection of a parked trailer to a vehicle with minimal manual interaction from a user.

Connecting a trailer to a vehicle can be a tiresome and needlessly difficult process. In addition to connecting the trailer to the tow bar of the vehicle, the power cord must be connected, the parking brake must be disconnected and the support wheel or the support column(s) must be raised, provided that the trailer has these features. Connecting smaller trailers to the vehicle can also be strenuous since the user often has to manually lift the trailer onto the tow bar.

US 20070007749 describes a coupling having a ball neck body pivoted around an axis between the operating and the rest positions. Rotation blocking bodies are placed in connection with an actuation mechanism, in order to direct the reaction forces perpendicular to the pivot axis.

US 20050167945 describes a device designed as a ball member to be connected to a fastener located on the trailer. The vehicle has a tow bar mounted behind the rear bumper. The coupling comprises a container fitted to a component that uses a load-carrying component, for sliding into a locked position by means of a spring-supported locking element for attaching the device in resting or working position.

EP 1535765 describes a trailer coupling for motor vehicles, which has a coupling arm with drive means acting on a rotary axis element through a rotational bearing. By means of a movement device, the mounting piece is pressed into a recess holding the coupling to the connector housing in order to lock it therein.

U.S. Pat. No. 6,000,709A describes a trailer coupling for motor vehicles, in particular passenger vehicles, having a coupling ball and a ball neck. One end region of the neck is angled and bears the coupling ball. Using a drive motor, the ball neck is movable with the coupling ball from an operative position into rest position, and vice-versa. To operate as safely as possible, a control feature (e.g., interlock) is provided for operating the drive to allow either movement of the ball neck or traveling of the motor vehicle in separate operations.

US2009236825A1 describes a system for assisting the attachment of a trailer to a vehicle, making use of an air suspension system of the vehicle for elevating and lowering the tow bar in connection with the attachment of the trailer to the vehicle. An obvious limitation with this solution is that the movability of the tow bar is limited to capabilities of the air suspension system of the vehicle. It is further required that the vehicle is equipped with such an air suspension system—a feature that many of today's vehicles do not have. Since retrofitting such an air suspension system is difficult, thus, this solution will be limited to only a few vehicle types.

US2002125018A1 describes a coupling system for coupling an implementation to a utility vehicle. However, this particular solution is not adaptable to a passenger car type of vehicle.

US2006290100A1 describes a vehicle-hitch alignment system with no movement of the tow bar in relation to the vehicle.

U.S. Pat. No. 6,164,681A describes an automatic hitch coupler comprising a pivotal guide for a trailer hitch guiding a trailer socket to engage a hitch ball as the user operates the trailer guide to engage the trailer socket. The pivotal guide comprises a base plate provided with a hitch ball, which base plate is pivotally connected to a hitch bar connected to a vehicle. When a trailer tongue engages the base plate, the hitch ball is tilted to become positioned directly below the trailer socket. Further, the guide has two locking devices for securing the base plate to the hitch bar.

DE 10 2010 004920 A1 describes a device using relative positioning to align a vehicle with a trailer for coupling thereto, by active steering of the vehicle or by laterally controlling the tow bar and manually driving the vehicle by assistance of the device. It is also described that the tow bar may be raised by a motor and brought into engagement with the trailer coupling. However, no feasible solution is described for other than the lateral movement.

WO2015005795 A1, in the name of the applicant, describes a system and method for connecting or disconnecting a trailer to a vehicle comprising a tow bar mounted to the vehicle, a trailer hitch mounted on the trailer, at least one motor mounted in connection with the tow bar and a control of said at least one motor. WO2015005795 A1 provides a solution where said tow bar automatically can connect to the trailer hitch mounted on the trailer when these are within a predetermined radius of one another. According to one embodiment, the tow bar moves out from underneath the vehicle. The tow bar can move in all directions and, furthermore, it can move until it connects with the trailer hitch. It is further described that when the tow bar and the trailer hitch are connected, the link between the vehicle and the trailer will automatically be locked. The parking brakes on the trailer will automatically disconnect and the support wheel will be raised. Further, one can automatically connect a pneumatic system, safety wire and electric cable. The tow bar will then automatically centre itself to the towing position. No feasible solutions for how the tow bar may be arranged are though described.

The main disadvantage with the prior art solutions is that they are not arranged for connection to the trailer from some distance. They all require positioning of the vehicle in close proximity of the trailer. Further, the prior art solutions require the trailer to be positioned with its connection head/trailer hitch at an ideal position to allow connection of the tow bar and the trailer hitch.

A further disadvantage associated with the prior art solutions is that they are only suitable for connection or disconnection of the trailer from the vehicle.

Accordingly, prior art solutions mostly describe the result to be achieved without referring or disclosing feasible solutions capable of achieving the result.

It is accordingly a need for a trailer coupling assembly and vehicle with trailer coupling assembly to enable connection or disconnection or both of a trailer to a vehicle.

It is further identified a need for a trailer coupling assembly and vehicle with trailer coupling assembly that do not require the trailer or vehicle to be positioned in an optimal position to enable connection.

There is also a need for a trailer coupling assembly and vehicle with trailer coupling assembly that do not require a trailer to be optimally parked to enable connection to a vehicle.

Moreover, it is a matter of fact that the age of the population in the world increases, which increases the need for automated systems for connection and disconnection of a trailer to a vehicle.

In addition, with the current focus on developing self-driving (autonomous) vehicles, there will be a need for trailer coupling assemblies for automated connection or disconnection or both of a trailer to/from a vehicle in the future.

A trend is further that users are looking for more and more convenience features when investing in vehicles and trailers.

Further, the accuracy of positioning, digital and mechatronical devices and systems is increasing as the technology develops at the same time as the costs of them are rapidly decreasing, resulting in that users may prioritize to have such device and systems integrated in vehicle.

SUMMARY

Provided herein is a trailer coupling assembly that partly or entirely overcomes or eliminates the drawbacks of prior art.

Also provided is a trailer coupling assembly enabling both connection and disconnection of a trailer to/from a vehicle.

Also provided is a trailer coupling assembly enabling connection of a parked trailer to a vehicle also when the trailer is not parked in an optimal position relative to the vehicle.

Also provided is a trailer coupling assembly enabling connection of a parked trailer to a vehicle from a distance.

Also provided is a trailer coupling assembly enabling movement of the trailer during a connection or disconnection operation.

Also provided is a trailer coupling assembly that requires minimal manual actions from a user.

Also provided is a trailer coupling assembly that, after the trailer is connected to the vehicle, is arranged to go into locked position wherein the load carrying capacity of the vehicle and trailer becomes optimal within preapproved capabilities of the vehicle.

Also provided is a trailer coupling assembly suitable for use with self-driving vehicles enabling automated, or semi-automated, connection and disconnection of a trailer to a vehicle.

Also provided is a vehicle with a trailer coupling assembly as described above.

A trailer coupling assembly is arranged to a support structure of a vehicle or support structure of a trailer, enabling automated or semi-automated connection or disconnection of a trailer to a vehicle.

Accordingly, the trailer coupling assembly may be either arranged to the vehicle or the trailer, depending on the requirements or desires of the user.

For arrangement to a vehicle, the trailer coupling assembly comprises a tow bar. For arrangement to a trailer, the trailer coupling assembly comprises a connection head/trailer hitch.

According to a first embodiment of the trailer coupling assembly, an intermediate connection device is provided for enabling movement of the tow bar or connection head/trailer hitch in vertical direction and/or longitudinal direction of the vehicle or trailer, respectively.

According to a further embodiment of the trailer coupling assembly, at least one additional intermediate connection device is provided for enabling movement and/or rotation of the tow bar or connection head/trailer hitch in longitudinal direction and/or vertical direction of the vehicle or trailer, respectively.

According to a further embodiment of the trailer coupling assembly according to the present invention it comprises at least one additional intermediate connection device enabling movement of the tow bar or connection head/trailer hitch in a transversal direction of the vehicle or trailer, respectively.

In accordance with a further embodiment of the trailer coupling assembly, at least one additional intermediate connection device is provided for enabling spatial movement of the tow bar or connection head/trailer hitch relative the vehicle or trailer, respectively.

In accordance with a further embodiment of the trailer coupling assembly, at least one additional intermediate connection device is provided for enabling movement and/or rotation of a hitch ball of the tow bar about a transversal axis of the tow bar.

According to a further embodiment of the trailer coupling assembly, means for moving the trailer are provided, enabling the trailer to be moved on the ground (i.e., in the horizontal plane).

In accordance with a further embodiment of the trailer coupling assembly, the connection head/trailer hitch is provided with a locking mechanism to secure controlled attachment to the tow bar.

The embodiments accordingly provide a trailer coupling assembly arranged either to the vehicle or trailer, and which facilitates the coupling of a trailer to a vehicle by means of an intermediate connection device, wherein the trailer coupling assembly may be provided with one or more additional intermediate connection devices for increased movability of the trailer coupling assembly.

By means of the disclosed trailer coupling assembly, the requirement of exact positioning of the vehicle relative to the trailer to enable coupling thereof may be reduced by that the trailer coupling assembly provides movability for the tow bar or connection head/trailer hitch along one or more coordinate axes. This movability enables connection and/or disconnection of the trailer to/from the vehicle in an automated or semi-automated manner within a working radius of the trailer coupling assembly.

The trailer coupling assembly provides a solution where the trailer after being connected to the vehicle, is arranged in towing position, wherein the load carrying capacity is optimal for the classified towing load of the vehicle, ensuring optimal load transfer into the vehicle structure.

The vehicle and/or trailer is preferably provided with sensors and/or camera providing information to a control unit, either a separate control unit of the trailer or a control unit of the vehicle, for controlling the trailer coupling assembly to perform an automated or semi-automated connection or disconnection of the trailer to the vehicle with minimal manual actions of the user.

The trailer may also be provided with automated features for raising and lowering of support means for the trailer, operation of parking brake(s) and/or connection and disconnection of signals (wired or wireless), safety means and/or pneumatic or hydraulic hoses between connection means of the trailer and vehicle.

The trailer may further be provided with wireless or wired communication.

Depending on the desires of the user or manufacturer, the degree of automation of the connection and disconnection process, may be implemented by adding one or more of the above-mentioned features of the trailer coupling assembly and trailer.

Via the disclosed embodiments, one avoids that the user incorrectly connects the trailer to the vehicle, which could cause accidents, as well as avoiding potential damages to the user (strain, injuries, etc.) or vehicle or trailer when the user is handling (lifting, pushing, pulling, etc.) a heavy-weight trailer.

The trailer coupling assembly is also suitable for the expected future development of self-driving vehicles/transportation means, as the use of self-driving vehicles will require an automated trailer coupling assembly to achieve connection and disconnection of trailers to a vehicle with no or minimum human interference.

Also provided is a vehicle with a trailer coupling assembly according to the description above.

Further preferable features and advantageous details of the disclosed embodiments will appear from the following descriptions of examples, claims and attached drawings.

BRIEF DESCRIPTION OF THE DRAWINGS

The present invention will below be described in further details with reference to the attached drawings, where.

DETAILED DESCRIPTION

Figure 1:
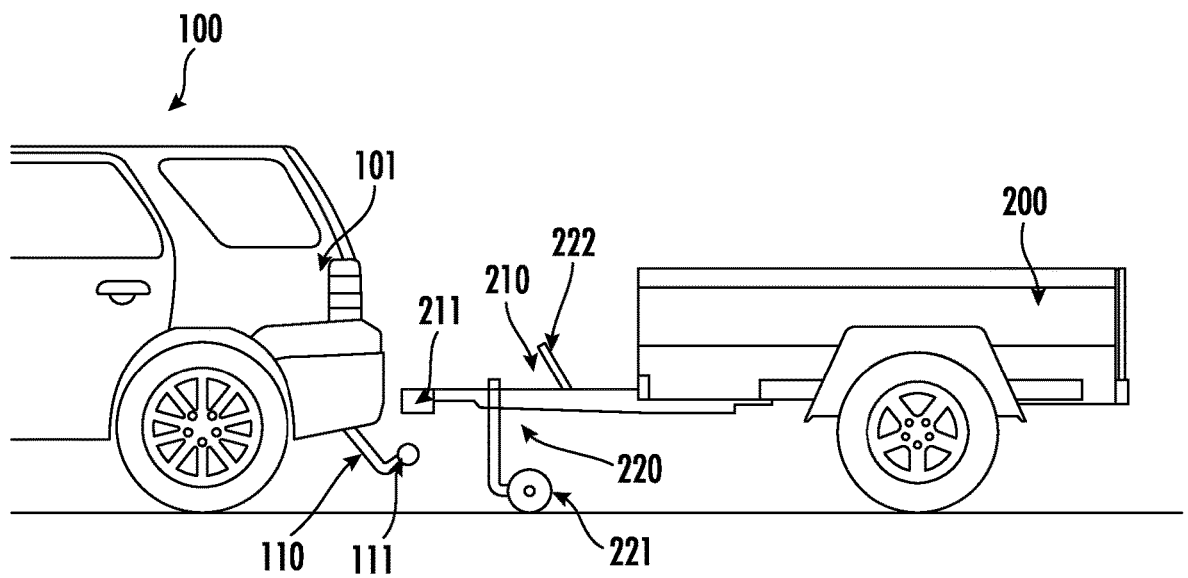
FIG. 1 is a principle drawing of a vehicle and trailer.

Reference is now made to FIG. 1 showing a typical situation where a vehicle 100, in the form of a passenger car, provided with at tow bar 110 arranged at rear end 101 thereof, the tow bar 110 comprising a hitch ball 111 thereof for coupling to a trailer 200 with a drawbar 210 with a connection head/trailer hitch 211 for connection to the tow bar 110 of the vehicle 100.

The tow bar 110 is fixed to a support structure 130, shown in FIGS. 3A-3D, 4A and 4B, at the rear end 101 of the vehicle 100 or hidden underneath (the chassis of) the vehicle 100 when not in use and movable back to a towing position when required, as discussed above.

The trailer 200 may further be provided with at least one support leg 220, optionally with one or more wheels 221. The support leg 220 may further be movable in the vertical direction of the trailer 200 to enable adjustment of the connection head/trailer hitch 211 to enable connection with the tow bar 110 of the vehicle 100. The trailer may further be provided with brakes, typically mechanically, electrically or pneumatically operated ones, as well as a manual parking brake that may be operated by a parking brake handle 222, if the brakes are mechanically operated.

The trailer 200 may further be provided with illumination means, such as marking lights, parking lights, reversing light, brake light, etc.

Figure 2:
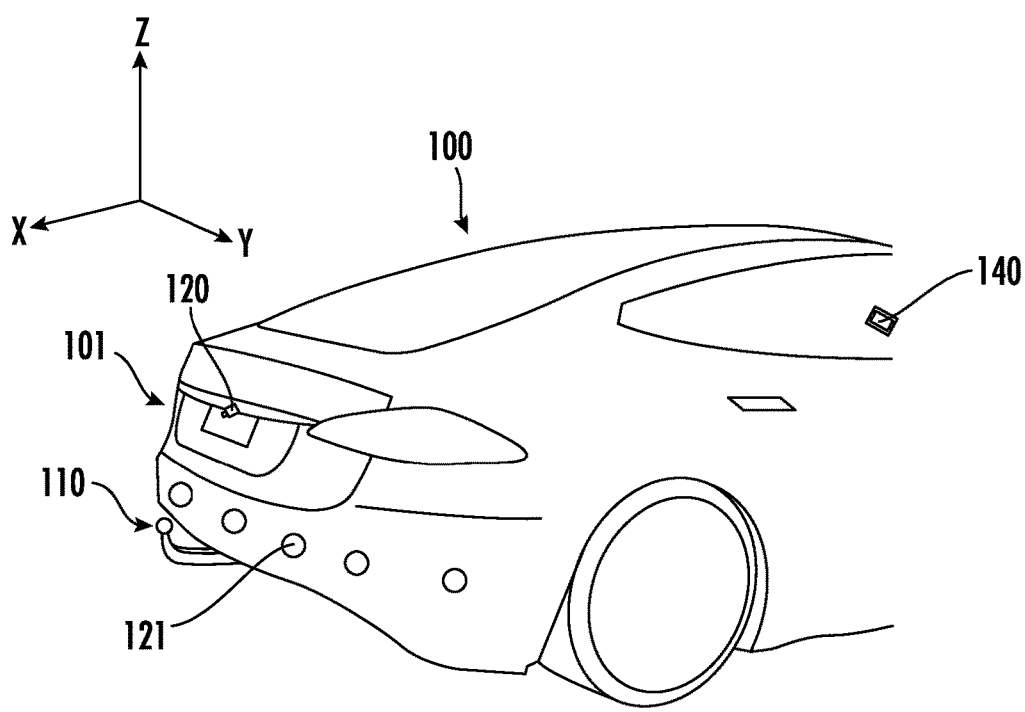
FIG. 2 is a principle drawing of a vehicle for definition of a coordinate system.

Reference is made to FIG. 2 for introduction of a coordinate system that defines coordinate axes relative to the vehicle 100, which will be used in the following description. The Y-axis is the transversal direction of the vehicle 100, the Z-axis is the vertical direction of the vehicle 100 and the X-axis is the longitudinal direction of the vehicle 100. A similar coordinate system will be used relative to the trailer 200.

As shown in the figure, most of the commercially available vehicles 100 sold today are further equipped with at least one rear-view camera 120 and/or proximity (distance) sensors 121 at the rear for detection of an obstacle when the vehicle is reversing. The vehicle 100 may also be equipped with other sensor systems, such as laser, radar, laser radar, LIDAR, LADAR, etc., used for the same purpose. In addition to such parking features, there exist intelligent parking assistants that can be activated by the driver at the push of a button, calculating the steering angle that is required based on the relative position of the vehicle to the existing limitations of a parking space, such as other parked motor vehicles, trees or other obstacles, autonomously parking the vehicle into a selected space. Vehicles 100 with a parking assistant have a so-called active steering, which then automatically steers the vehicle into the parking space; i.e., without any steering actions required by the driver, who only has to slightly accelerate and brake. These systems are well-known for a skilled person and requires no further description herein.

A trailer coupling assembly 300 is arranged to a support structure 130, shown in FIGS. 3A-3D, 4A and 4B, at rear end 101 of a vehicle 100, such as, but not limited to, a passenger car.

The trailer coupling assembly 300 comprises a tow bar 110 with a hitch ball 111, wherein the tow bar 110 and thus hitch ball 111 are arranged to be movable in at least the vertical direction (Z-axis) of the vehicle 100. As will be shown by several non-limiting examples below, this may be achieved in different ways.

Figure 3A:
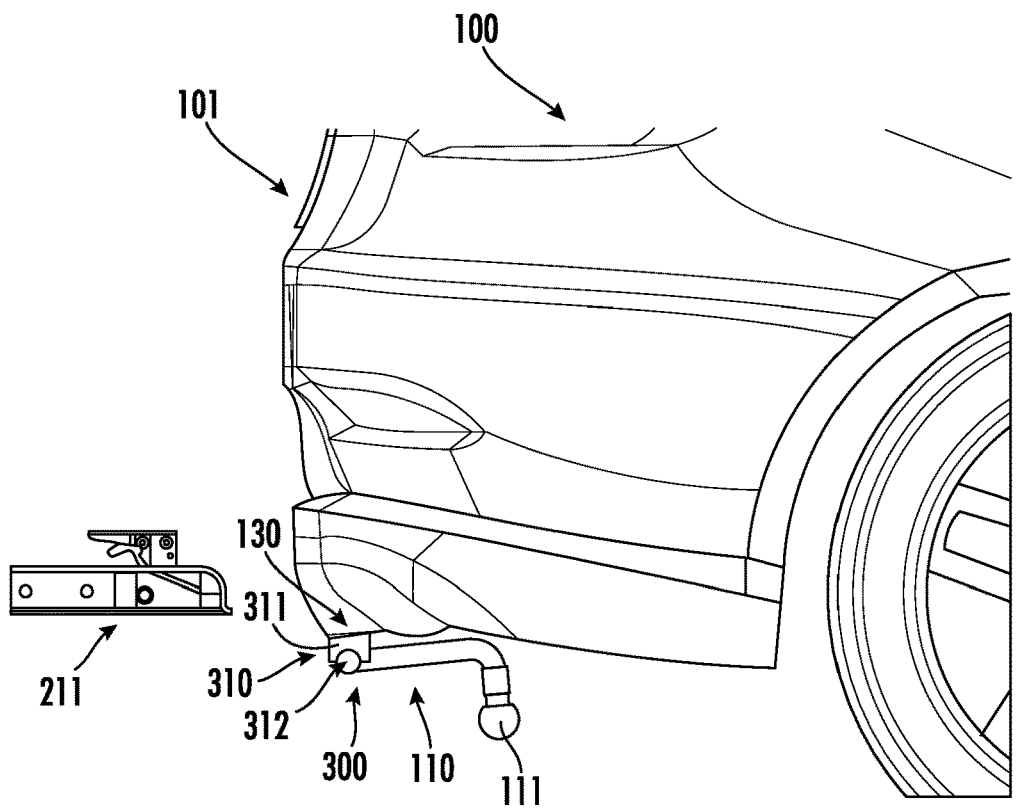
FIGS. 3A-3D are principle drawings of a first embodiment of the disclosed trailer coupling assembly.
Figure 3B:
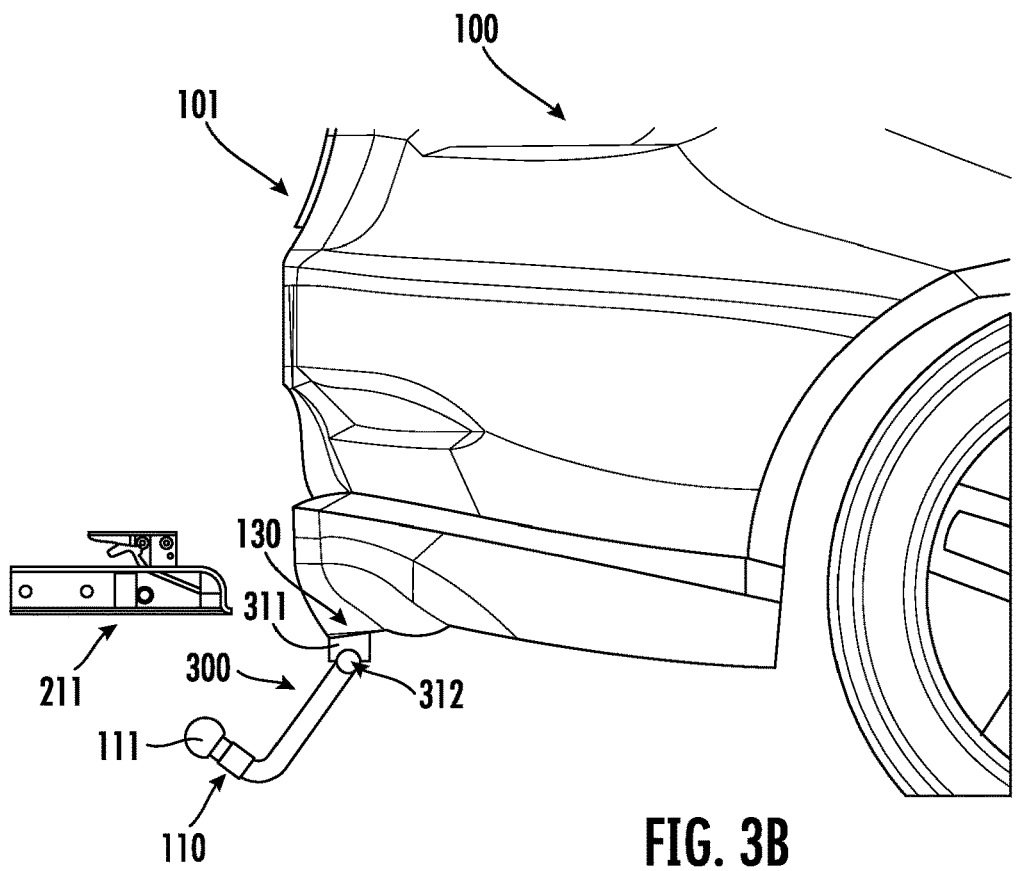
Figure 3C:
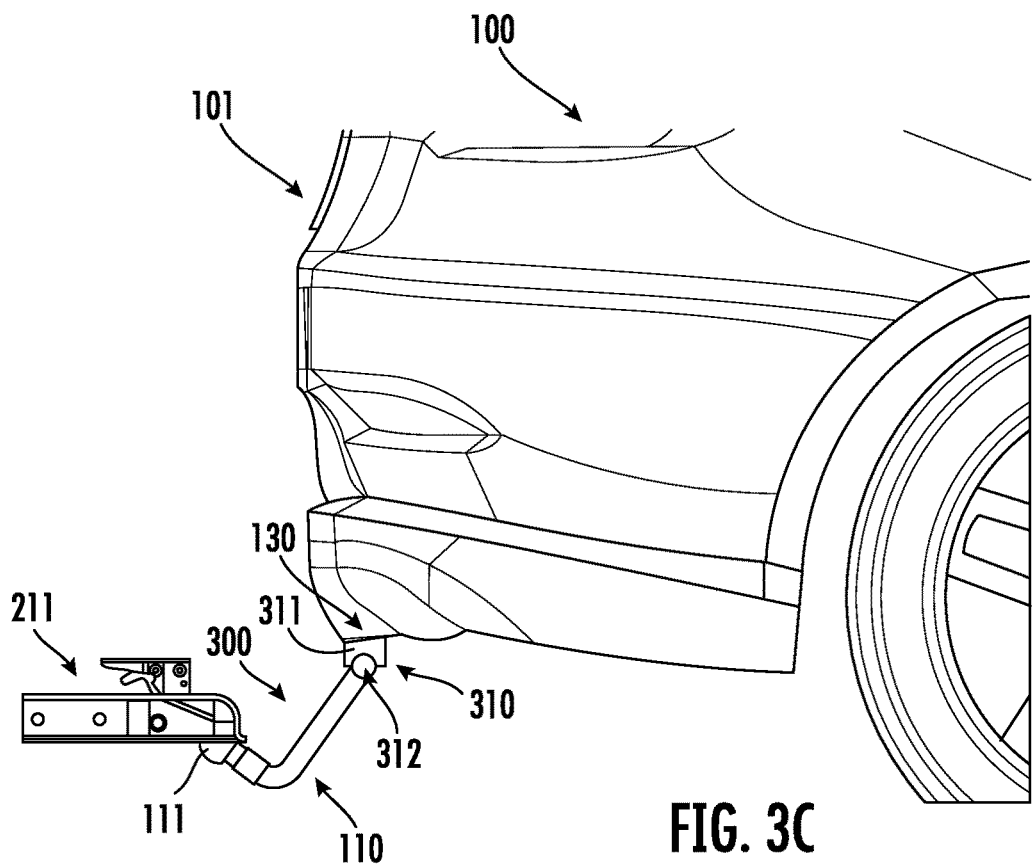
Figure 3D:
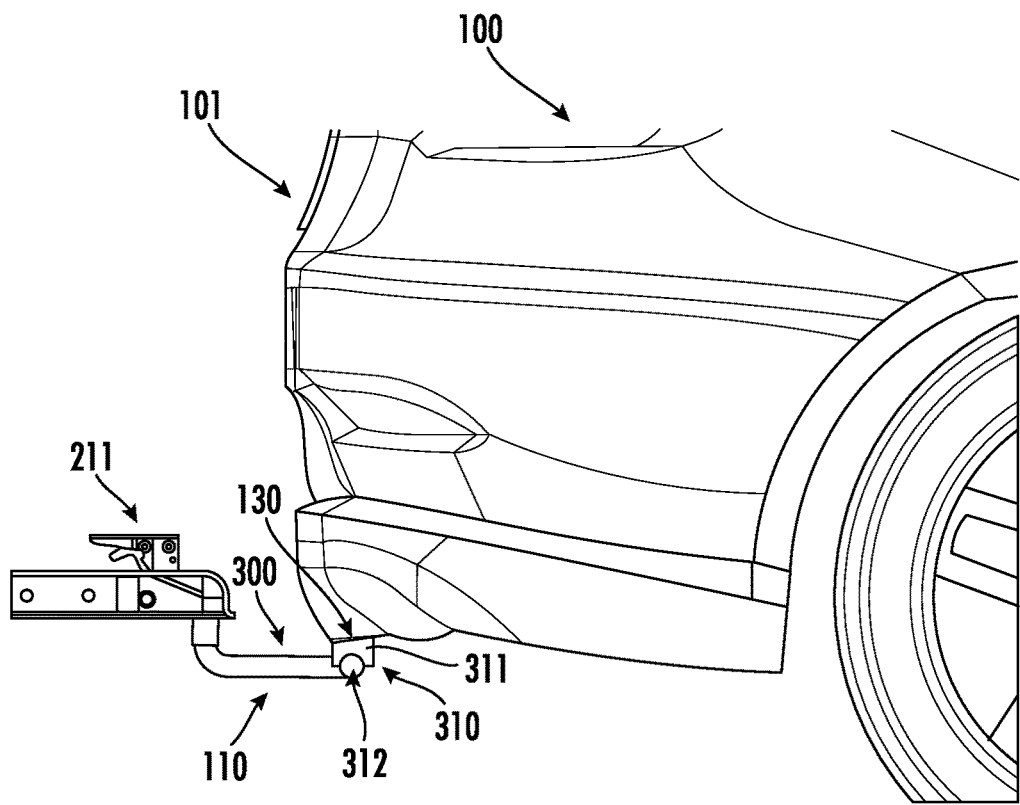

Reference is now made to FIGS. 3A-3D showing a first embodiment of the trailer coupling assembly 300, wherein the tow bar 110 is movable in the vertical direction (Z-axis) from a hidden position under the vehicle 100 and to a connection position located at a distance from the vehicle 100, and vice-versa. The trailer coupling assembly 300 according to the first embodiment comprises an intermediate connection device 310 enabling (rotational) movement of a tow bar 110 arranged thereto primarily in vertical direction of the vehicle 100. The intermediate connection device 310 is arranged to a support structure 130 of the vehicle 100 at upper end and at lower end arranged to the tow bar 110. The intermediate connection device 310 comprises a main body 311 arranged to a support structure 130 of the vehicle 100 at upper end and to the tow bar 110 at the lower end. In the shown embodiment, the tow bar 110 is mainly L-shaped with a hitch ball 111 at the free end thereof. The tow bar 110 is arranged to the lower end of the main body 311 via a rotational interface 312 enabling rotation of the tow bar 110 about the Y-axis, compromising movement in the vertical X-Z plane relative to the vehicle 100. By this is achieved a rotational movement of the tow bar 110 from a hidden position underneath the vehicle 100, as illustrated principally in FIG. 3A, to a towing position at a distance from the vehicle 100, as shown in FIG. 3D. To ensure a fully hidden position underneath the vehicle 100, the movement of the tow bar 110 about the X-axis (global vehicle system) may be performed manually, semi-automatic of fully automatic. Further, the tow bar 110 may also be hidden in the chassis of the vehicle by Y-axis rotation only, depending on geometrical constraints of the L-shaped the tow bar 110 and the fascia of the vehicle 100.

Figure 4A:
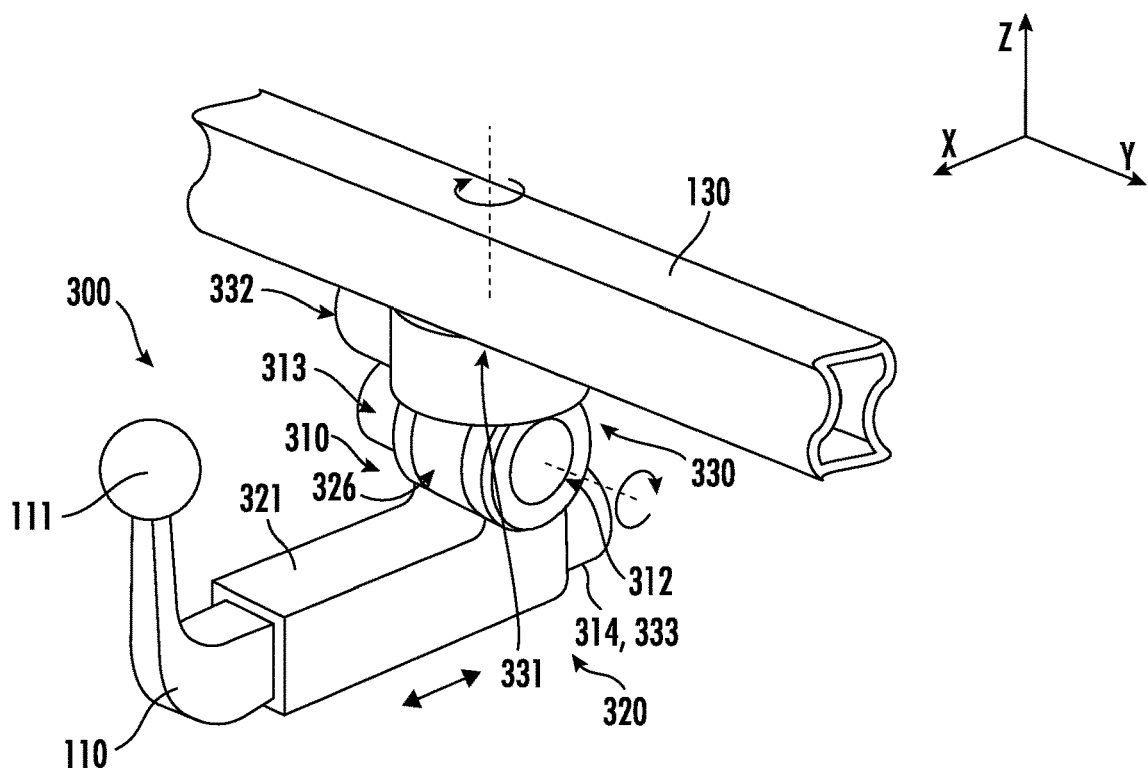
FIGS. 4A-4C are principle drawings of a second embodiment of the disclosed trailer coupling assembly.
Figure 4B:
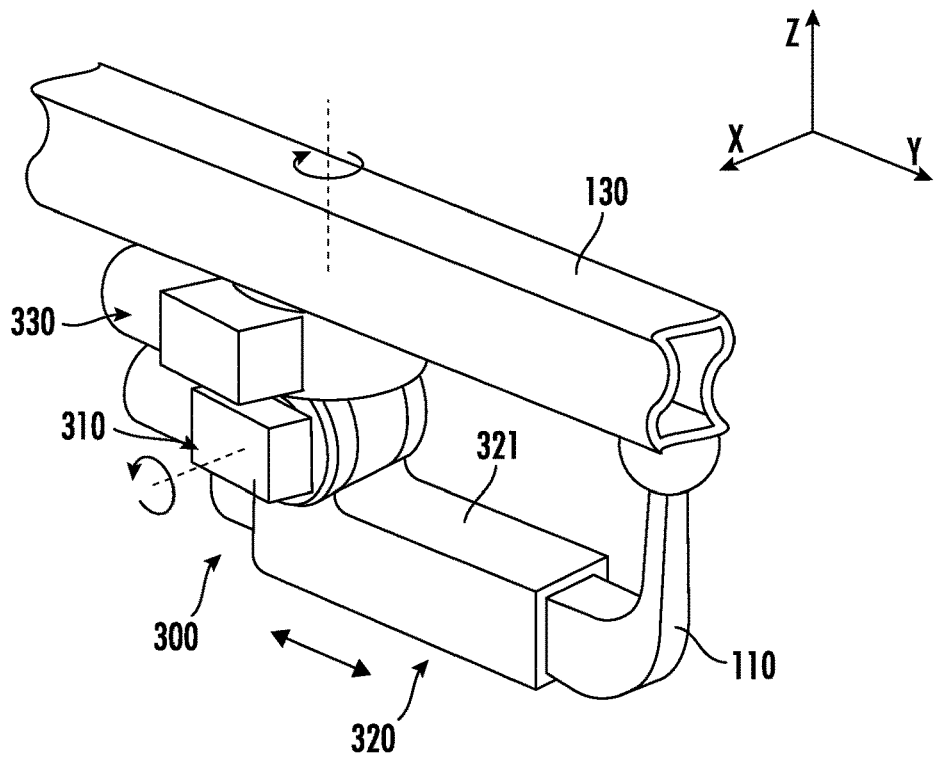
Figure 4C:
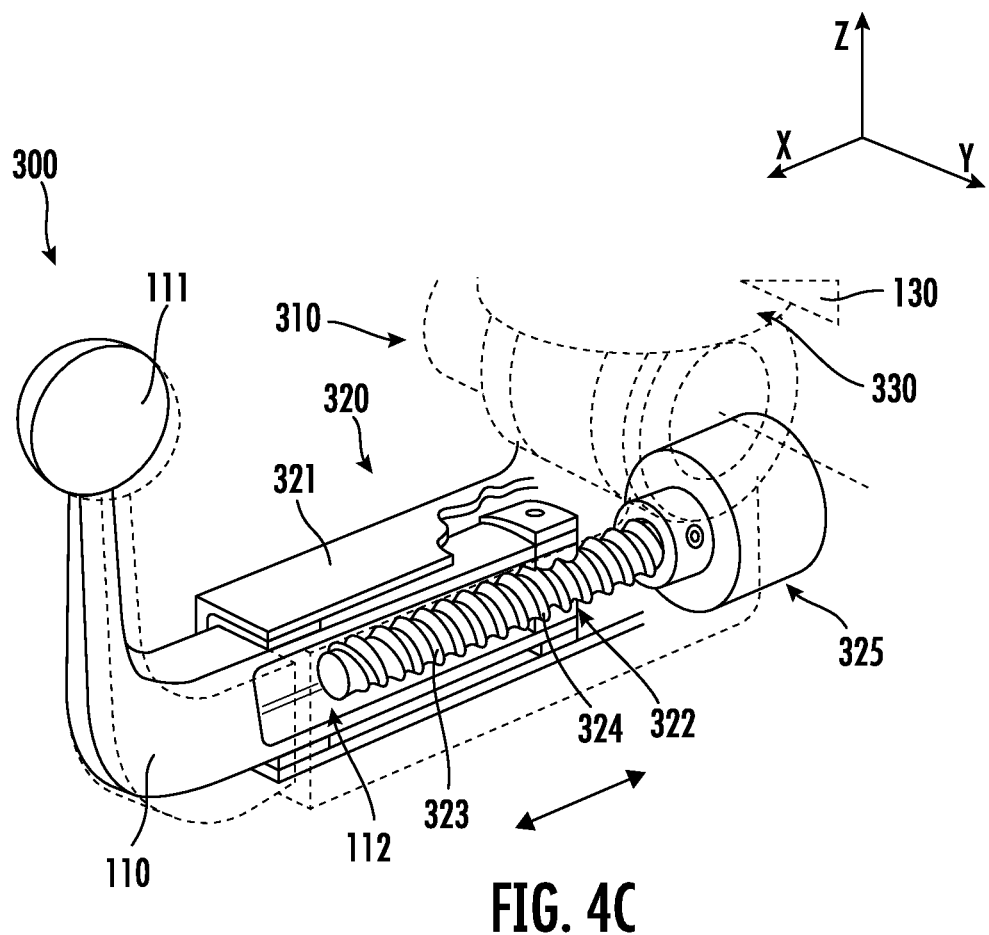

The rotational interface 312 may be achieved in several ways. The rotational interface 312 is, e.g., achieved by a slewing ring with at least one slewing gear drive driven by an electric motor 313 (whose principles are shown in FIGS. 4A-4C), providing a rotational movement of the respective parts relative to each other, an electric motor 313 provided with a shaft with a gear in engagement with threads, gear or similar arranged in one or more rotational connections 314 (as e.g., shown in FIG. 4A), such as mounting brackets, mounting ears, joints or similar, of the main body 311, for connection to one or more rotational connections 326 (FIG. 4A), such as mounting brackets, mounting ears, joints or similar, of the tow bar 110, as shown in FIGS. 4A and 4B for an additional intermediate connection device 330. Other suitable solutions will be within the knowledge of a skilled person.

Accordingly, in the embodiment of FIGS. 3A-3D is provided a pendulum-movement of the tow bar 110 about a rotational axis at lower part of the intermediate connection device 310, enabling movement both along Z-axis of the vehicle, as well as in X-axis of the vehicle 100.

By the embodiment of FIGS. 3A-3D, a driver or a semi-automated or automated system will be used to position the vehicle 100 in correct position relative to the trailer 200, such that by activation of the trailer coupling assembly 300, the tow bar 110 by means of the rotational interface 312 will move from the position underneath the vehicle 100 and into engagement with the connection head/trailer hitch 211. An advantage with the embodiment of FIGS. 3A-3D is that the trailer coupling assembly 300 is provided with significant movability in the vertical direction (Z-axis) of the vehicle 100, enabling the tow bar 110 to hook up a trailer also at low heights above the ground level.

Figure 14:
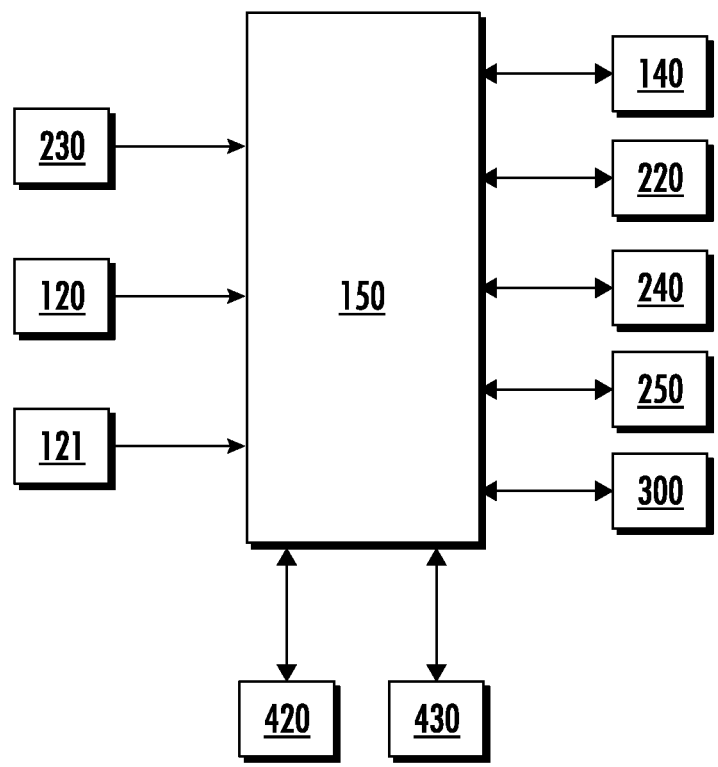
FIG. 14 is block diagram of controlling of the trailer coupling assembly according to the disclosure.

A more detailed description of the control procedure for connection and disconnection of the trailer 200 to the vehicle 100 will be described in further detail below with reference to FIG. 14, showing a block diagram of controlling of the trailer coupling assembly 300.

FIGS. 3A-3D show the principally simplest achievable trailer coupling assembly 300 with one degree of freedom for movement of the tow bar 110 in the X-Z plane relative to the vehicle 100. As will be disclosed in the following examples of embodiments of a trailer coupling assembly 300, the trailer coupling assembly 300 may be provided with other or additional degrees of freedom for enabling movement of the tow bar 110 and thus hitch ball 111 in different directions relative to the vehicle 100. Thus, achieving improved flexibility for coupling to a parked trailer 200, superior any prior art solution, such as one or more or combinations of: in transversal direction (Y-axis), in vertical direction (Z-axis) and/or rotatable about the transversal (Y-axis), vertical (Z-axis) and/or longitudinal (X-axis) axes.

Reference is now made to FIGS. 4A-4C showing principle drawings of a second example embodiment of a trailer coupling assembly 300. The trailer coupling assembly 300 according to the second embodiment comprises a first additional intermediate connection device 320 enabling movement of a tow bar 110 arranged thereto in the longitudinal direction (X-axis) of the vehicle 100. The first additional intermediate connection device 320 is in the shown embodiment formed by an elongated main body 321 arranged to accommodate one end of a tow bar 110 with a hitch ball 111 at the free end thereof. The tow bar 110 is in the shown embodiment mainly L-shaped and is arranged movable in longitudinal direction (X-axis) of the elongated main body 321 by means of a rotational interface 322 (see FIG. 4C). The rotational interface 322 is formed, e.g., by a linear actuator 323, in the form of a worm screw in engagement with a fixed nut 324. The tow bar 110 is provided with a longitudinally extending 112 recess, see FIG. 4C, arranged to accommodate the linear actuator 323 (longitudinally extending worm screw) and the nut 324 is fixed in the tow bar recess 112 in engagement with the linear actuator 323. The linear actuator 323 is at the end extending out of the tow bar 110 arranged to an electric motor 325, fixed at the end of the main body 321, for controlled rotation of the linear actuator 323. By rotation of the linear actuator 323 by means of the electric motor 325 in one direction the tow bar 110 will be moved in longitudinal direction (along X-axis) of the main body 321, protruding out of the main body 321. By rotation of the linear actuator 323 in the opposite rotational direction, the tow bar 110 will be retracted into the main body 321. Accordingly, this embodiment provides a telescopic arrangement of the tow bar 110 and hitch ball 111 relative to the main body 321, enabling movement of the tow bar 110 and thus hitch ball 111 in longitudinal direction (along X-axis) of the vehicle 100.

An advantage of using a telescopic tow bar 110, as described above, is that it requires less space for hiding the tow bar 110 when not used.

Accordingly, in addition to movement in the vertical X-Z plane, as described in FIGS. 3A-3D, the trailer coupling assembly 300 by the embodiment of FIGS. 4A-4C, is provided with a second degree of freedom, wherein the tow bar 110 is movable in the longitudinal direction (X-axis) of the vehicle 100, independent of the movement in the Z-direction, providing improved movability in longitudinal direction of the vehicle 100, compared to the embodiment of FIGS. 3A-3D. Further degrees of freedom will be described below.

However, if movability only is required in the longitudinal direction (X-axis) relative to the vehicle 100, the main body 321 may be mechanically fixed to the support structure 130 of the vehicle 100 by a fastening device. Accordingly, providing a trailer coupling assembly 300 with only one degree of freedom, facilitating movement in the longitudinal direction (X-axis).

If further movability in other directions is required, the main body 321 may be arranged to the support structure 130 via one or more rotational, pivotable or tiltable additional intermediate connection devices, enabling movement of the tow bar 110 and thus hitch ball 111 in other directions than the longitudinal direction (along X-axis) of the vehicle 100, as will be described below.

In the shown embodiment, the trailer coupling assembly 300 comprises the intermediate connection device 310 of the first embodiment, FIGS. 3A-3D, enabling rotation of the additional intermediate connection device 320 about the Y-axis (coupled movements in X-Z plane) relative to the vehicle 100 via the rotational interface 312. In the case where the intermediate connection device 310 is arranged to the support structure 130 of the vehicle 100 by a fastening device, the rotational interface 312 may as an alternative be arranged in a similar manner between the intermediate connection device 310 and the fastening device for arrangement to the support structure 130. The rotational interface 312 may be achieved in several ways, as described above; e.g., the rotational interface 312 is achieved by a slewing ring with at least one slewing gear drive driven by an electric motor 313, as shown in FIG. 4A, providing a rotational movement of the respective parts relative to each other, or using an electric motor 313 provided with a shaft with a gear in engagement with threads, gear or similar is arranged in one or more rotational connections 326, such as mounting brackets, mounting ears, joints or similar, of the main body 321, for connection to the one or more rotational connections 314 of the intermediate connection device 310. Other suitable solutions will be within the knowledge of a skilled person.

Accordingly, the first additional intermediate connection device 320 in this embodiment provides additional movement in the longitudinal direction (X-axis) of the tow bar 110 and hitch ball 111, in addition to the above-described movability in the vertical direction (Z-axis) and longitudinal direction (X-axis) provided by the intermediate connection device 310.

In the shown embodiment, the trailer coupling assembly 300 also comprises a second additional intermediate connection device 330 arranged to the intermediate connection device 310 provided with a rotational interface 331 enabling rotation of the intermediate connection device 310 about Z-axis and, if present, the first additional intermediate connection device 320 in the horizontal X-Y plane. The rotational interface 331 can be arranged between the intermediate connection device 310 and the first additional intermediate connection device 320, or between the intermediate connection device 310 and the support structure 130 of the vehicle 100, as shown in the example. The rotational interface 331 may be achieved in several ways; e.g., the rotational interface 331 is achieved by a slewing ring with at least one slewing gear drive driven by an electric motor 332, providing a rotational movement of respective parts relative to each other, via one or more gears if required. Alternatively, the electric motor 332 is provided with a shaft that is in engagement with threads, gear or similar arranged in the intermediate connection device 310. Other suitable solutions will be within the knowledge of a skilled person. In the shown embodiment, the second additional intermediate connection device 330 is provided with rotational connections 333, such as mounting brackets, mounting ears, joints or similar, for connection to the one or more rotational connections 326 of the main body 320 of the first additional intermediate connection device 320, and wherein the intermediate connection device 310 is integrated in the connection between the first additional intermediate connection device 320 and second addition intermediate connection device 330, as shown in FIGS. 4A-4C. Accordingly, there is no need for a separate rotational connection between the first additional intermediate connection device 310 and the second additional intermediate connection device 320, as the connection is provided by the connection of the intermediate connection device 310 and the second additional intermediate connection device 320.

In an alternative embodiment, the second additional intermediate device 330 is fixed to the intermediate connection device 310 or first additional intermediate connection device 320 at one side and to the support structure 130 of the vehicle 100 at the other side. The rotational interface 331, as described above, is, e.g., arranged between the support structure 130 and the second additional intermediate connection device 330 and wherein the second additional intermediate connection device 330 is fixed to the intermediate connection device 310. Alternatively, the rotational interface 331 is arranged between the second additional intermediate connection device 330 and the main body 321 of the first additional intermediate connection device 320, wherein the second additional intermediate device 330 is fixed to the support structure 130.

Accordingly, the second additional intermediate connection device 330 in the embodiment shown in FIGS. 4A-4C enables adjustment in the X-Y horizontal plane (rotation about the Z-axis) of the tow bar 110 and hitch ball 111, in addition to the above-described movability in the longitudinal direction (X-axis) and/or vertical direction (Z-axis) enabled by the intermediate connection device 310 and first additional intermediate connection device 320, if present.

Due to the intermediate connection device 310 being integrated in the connection between the first 320 and second additional intermediate connection device 330 the solution will be favourable related to offering height flexibility of the trailer coupling assembly 300, which will be limited. It is well-known that there is limited packaging space available at rear end of a vehicle 100 for arrangement of tow bars 110, hence such a solution will be space efficient.

An advantage with using slewing rings is that the building height of the trailer coupling assembly 300 will be reduced, thus providing a more compact trailer coupling assembly 300.

Accordingly, depending on the requirement of movement of the tow bar 110 and hitch ball 111, the inventive embodiments provide opportunities for adding additional intermediate connection device 320, 330 with rotational interfaces 321, 331 for achieving rotation about Y- and Z-axes and additional movement flexibility in the longitudinal direction (X-axis), as described above. The above-described second additional intermediate connection device 330 may further be used for moving the tow bar 110 between a "hidden" position where it is retracted in or underneath the vehicle 100, as shown in FIG. 4B, and towing position, as shown in FIGS. 4A and 4C, possibly together with the features of the above-described intermediate connection device 310.

Further, the use of a tow bar 110 and thus hitch ball 111 that is arranged movable in the longitudinal direction of the vehicle 100, enables movement of the hitch ball 111 from a secure towing position or hidden position under the vehicle 100 to a connection position that is at a certain distance from the vehicle 100, and vice-versa.

Another advantage associated with the possibility to move the tow bar 110 and thus hitch ball 111 in longitudinal direction (along X-axis), enabled by the first additional intermediate connection device 320, is that the tow bar 110 and thus hitch ball 111 may be moved to a (connection) position further away from the vehicle 100 for connection to a parked trailer 200, and wherein the tow bar 110 with trailer 200 connected thereto, may be retracted to the vehicle 100; i.e., pulling the trailer 200 towards the vehicle 100, until the tow bar 110 is in a secure towing position, wherein secure connection of the trailer 200 to the vehicle 100 is achieved.

Such a solution will require less accurate positioning of the tow bar 110 by use of the vehicle 100 (driver or positioning system as mentioned above).

Other alternative embodiments will be described below.

Figure 5A:
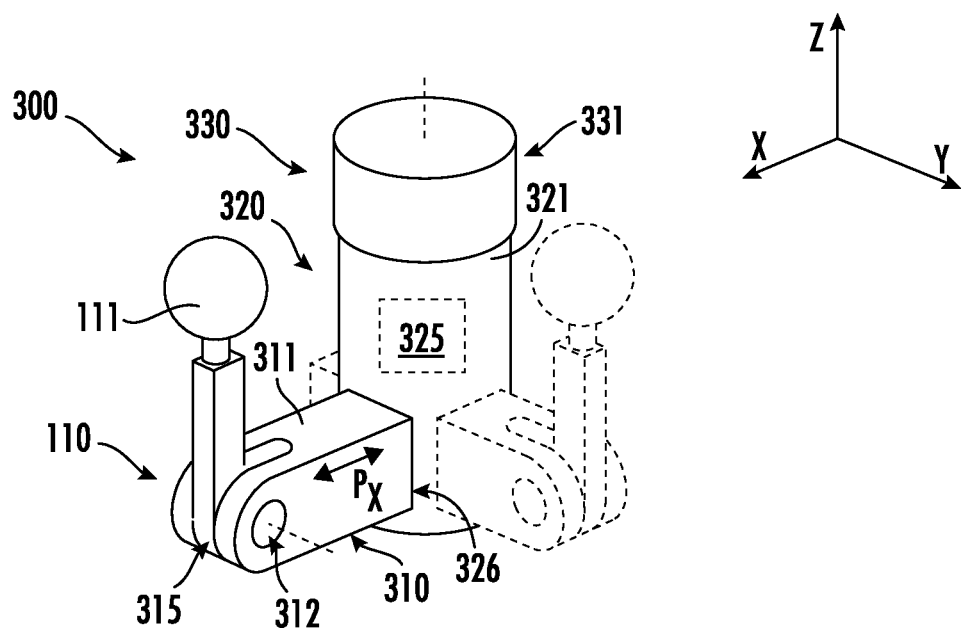
FIGS. 5A and 5B are principle drawings of a further embodiment of the disclosed trailer coupling assembly.
Figure 5B:
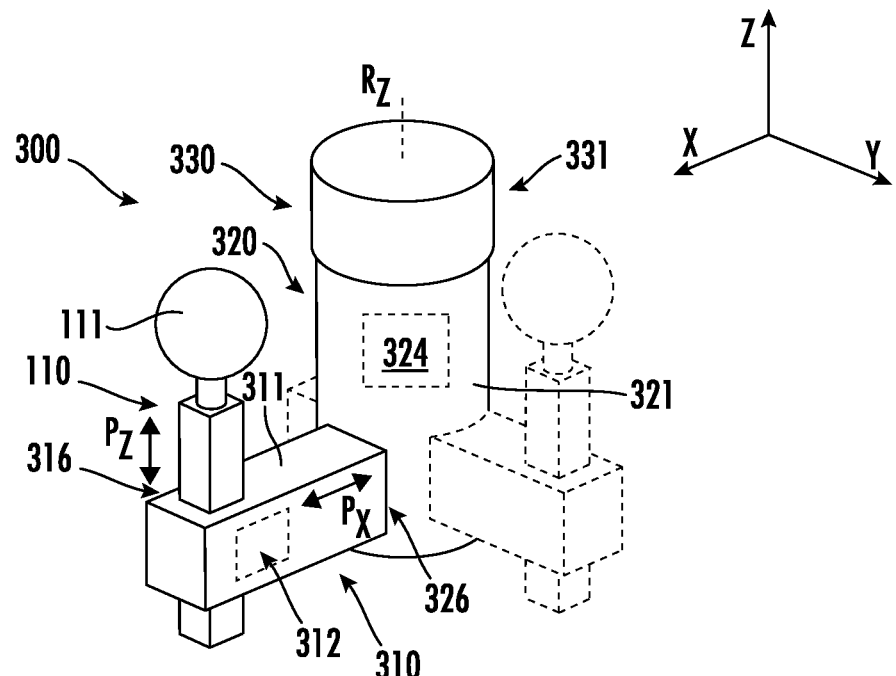

Reference is now made to FIGS. 5A and 5B showing principle drawings of further example embodiment of the trailer coupling assembly 300. In the embodiment of FIG. 5A, the trailer coupling assembly 300 comprises as above the second additional intermediate connection device 330. The second additional intermediate connection device 330 is at upper end arranged to the support structure 130 of the vehicle 100 and at lower end arranged to the first additional intermediate connection device 320, which in this embodiment is arranged with its longitudinal direction along the Z-axis of vehicle coordinate system. The elongated main body 321 of the first additional intermediate connection device 320 is at lower part thereof provided with a through hole or slot 326 extending in transversal direction of the main body 321, adapted for receiving and accommodating the main body 311 of the intermediate connection device 310, which in this embodiment is arranged with its longitudinal axis parallel with the X-axis; i.e., perpendicular to the main body 321 of the first additional intermediate connection device 320. The tow bar 110 is arranged to the free end of the main body 311 of the intermediate connection device 310 via the rotational interface 312, accordingly movable in the vertical direction (X-Z plane) by a pendulum movement.

The main body 311 is in the shown embodiment in FIG. 5A at the free end thereof provided with a recess 315 adapted for receiving the tow bar 110 and arranged movable by means of the rotational interface 312, as described above.

The intermediate connection device 310 and thus the tow bar 110 is movable in longitudinal direction (along X-axis) by means of the second additional intermediate connection device 320; e.g., implemented as described above or, e.g., by an electric motor 325 arranged in the main body 321 in engagement with threads or similarly arranged in the main body 311 of the intermediate connection device 310 by means of a shaft with a gear. Other possible alternatives for achieving movement of the main body 311 relative the main body 321 of the first additional intermediate connection device 320 will be within the knowledge of a skilled person.

Accordingly, in the embodiment of FIG. 5A, the tow bar 110 and thus hitch ball 111 are movable in the longitudinal direction (X-axis) by means of the first additional intermediate connection device 320. The tow bar 110 and thus hitch ball 111 are further movable in the vertical direction (Z-axis) by means of the rotational interface 312 of the intermediate connection device 310, as well as in longitudinal direction (X-axis) due to the pendulum movement. It is further movable in the X-Y horizontal plane (about the Z-axis) by means of the second additional intermediate connection device 330.

In FIG. 5B is shown alternative embodiment for enablement of movement of the tow bar 110 in the vertical direction. In the embodiment of FIG. 5A is enabled movement in the vertical direction in combination with movement in the longitudinal direction due to the rotational connection. In the embodiment of FIG. 5B is enabled separate movement in the vertical direction (along the Z-axis) by that the tow bar 110 is arranged movable in the perpendicular direction of the main body 311, instead of the rotatable solution in FIG. 5A. The solution of the embodiment of FIG. 5B allows for improved movement in the vertical direction of the tow bar 110 and thus hitch ball 111. This may, e.g., be achieved by that the main body 311 of the intermediate connection device 310 is provided with a through hole or slot 316 close to the free end of the main body 311 and wherein the rotational interface 312 is arranged for controlled movement of the tow bar 110 and thus hitch ball 111 in perpendicular direction of the main body 311, e.g., implemented in the same manner as the movement of the main body 311 relative to the main body 321, as described above. Other possible implementations will be within the knowledge of a skilled person.

The embodiments of FIGS. 5A and 5B do also provide the function of moving the tow bar 110 between a "hidden" position, where it is retracted in/underneath the vehicle 100, a secure towing position, where it is protruding from the vehicle 100, as well as movable to an advanced/extended connection position, as described above.

Figure 6:
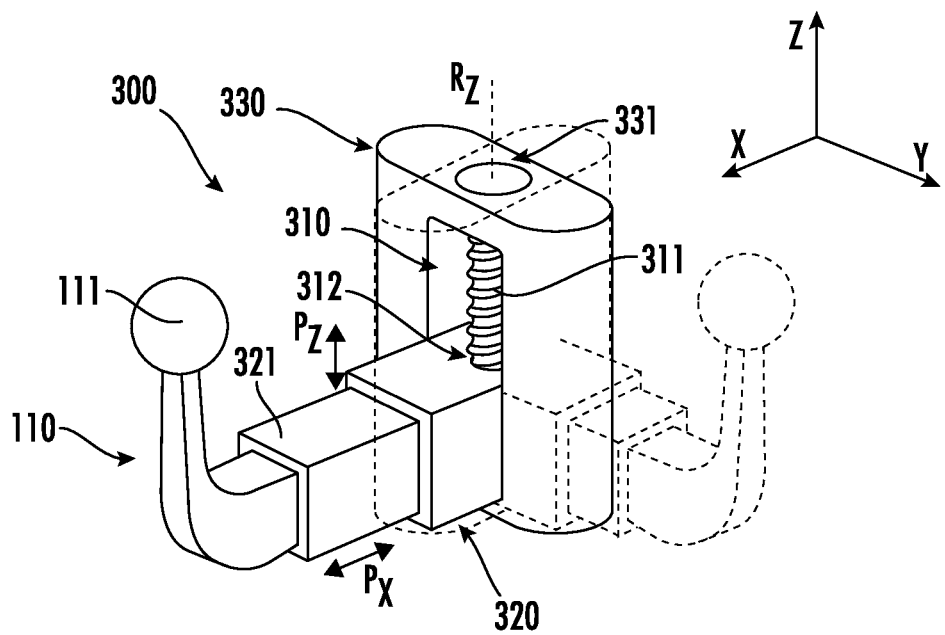
FIGS. 6-8 are principle drawings of further embodiments of the disclosed trailer coupling.

Reference is now made to FIG. 6 showing a further alternative embodiment of a trailer coupling assembly 300. In the embodiment of FIG. 6, the tow bar 110 is attached to a free end of a second additional intermediate connection device 320 in the form of a telescopic main body 321, such as a telescopic bar, arranged with its longitudinal direction in the X-direction, arranged at the other end to the second additional intermediate connection device 330 via the intermediate connection device 310 integrated therein.

In this embodiment, the main body 311 of the intermediate connection device 310 is acting, e.g., as a worm screw type linear actuator, extending with its longitudinal direction in a longitudinally extending recess of the second additional intermediate connection device 330, wherein the linear actuator is arranged in engagement with a telescopic main body 321 of the first additional intermediate connection device 320. The telescopic main body 321 is arranged to the linear actuator via a nut (not show) fixed at a rear end thereof providing a rotational interface 312, and thus arranged perpendicularly to the intermediate connection device 310. The main body 311, i.e. linear actuator, is driven (rotated) by an electric motor 313 (principally shown in FIG. 4A). By rotation in one direction the second additional intermediate connection device 320 and thus tow bar 110 are moved upwards along the Z-axis and by rotation in the opposite direction the second additional intermediate connection device 320 and thus tow bar 110 are moved downwards along the Z-axis.

The telescopic main body 321 may be operated/implemented in a similar manner as described for the telescopic tow bar 110 in FIGS. 4A-4C, i.e. by integrating a worm screw 323, nut 324 and an electric motor 325.

The second additional intermediate connection device 330 may be arranged as described above.

Accordingly, by this embodiment the tow bar 110 and thus hitch ball 111 is movable in longitudinal direction and in vertical direction as well as in the horizontal X-Y plane (about the Z-axis).

It should be mentioned that if movement in the longitudinal direction is not required, the tow bar 110 may be directly connected to the intermediate connection device 310.

The embodiment of FIG. 6 also provides the function of moving the tow bar 110 between a "hidden" position where it is retracted in/underneath the vehicle 100 and the towing position where it is protruding from the vehicle 100, as well as movable to an advanced/extended connection position, as described above.

Figure 7:
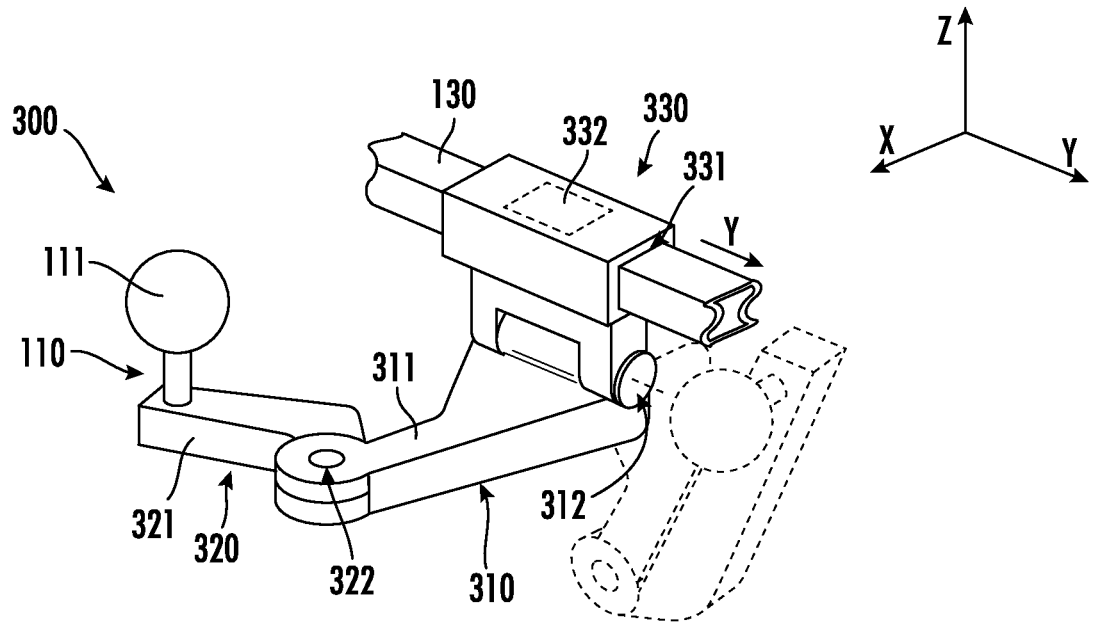

Reference is now made to FIG. 7 showing a further example embodiment of the trailer coupling assembly 300. In the shown embodiment, the trailer coupling assembly 300 comprises an intermediate connection device 310 comprising a main body 311 arranged to the second additional intermediate connection device 330 via the rotational interface 312 at one end and to the first additional intermediate connection device 320 at the other free end thereof, similar to the embodiment of FIGS. 4A-4C, wherein the tow bar 110 is arranged to the free end of the first additional intermediate connection device 320, wherein the tow bar 110 extending in perpendicular direction of the main body 321. Accordingly, in this embodiment the rotational interface 322 of the first intermediate connection device 320 provides a pivoting or rotational movement of the tow bar 110 in the X-Y horizontal plane (about the Z-axis), enabling movement of the tow bar 110 and thus hitch ball 111 in longitudinal direction (X-axis) and transversal direction (Y-axis) of the vehicle 100. The second additional intermediate connection device 330 is in this embodiment provides movably in transversal direction (along Y-axis) of the vehicle 100, by being arranged movable to the support structure 130, extending in transversal direction of the vehicle 100. Accordingly, by movement of the second additional intermediate connection device 330 along the support structure 130 of the vehicle 100 this will also move the intermediate connection device 310, the first additional intermediate connection device 320 and the tow bar 110 in the transversal direction (Y-axis) of the vehicle 100. The movement in transversal direction of the second intermediate device 330 can be achieved in several manners, e.g., by a rotational interface 331. The rotational interface 331 is, for example, achieved by that the second additional intermediate connection device 330 comprises an electric motor 332 with a shaft with gear that is in engagement with threads on the support structure 130. By rotation of the shaft of the electric motor 332 in one direction, the second intermediate connection device 330 is moved in one direction on the support structure 130. By rotation in the opposite direction of the shaft of the electric motor 332, the second additional intermediate connection device 330 is moved in the opposite direction on the support structure 130.

Other possible solutions for achieving movement in transversal direction will be within the knowledge of a skilled person.

The embodiment of FIG. 7 also provides the function of moving the tow bar 110 in the vertical direction (Z-axis) by the rotational interface 312, as well as in the longitudinal direction (X-axis) and transversal direction (Y-axis) by the rotational interface 322. The embodiment also provides movement of the tow bar 110 between a "hidden" position where it is retracted in/underneath the vehicle 100 and towing position where it is protruding from the vehicle 100 by the mentioned rotational interfaces 312 and 322.

Figure 8:
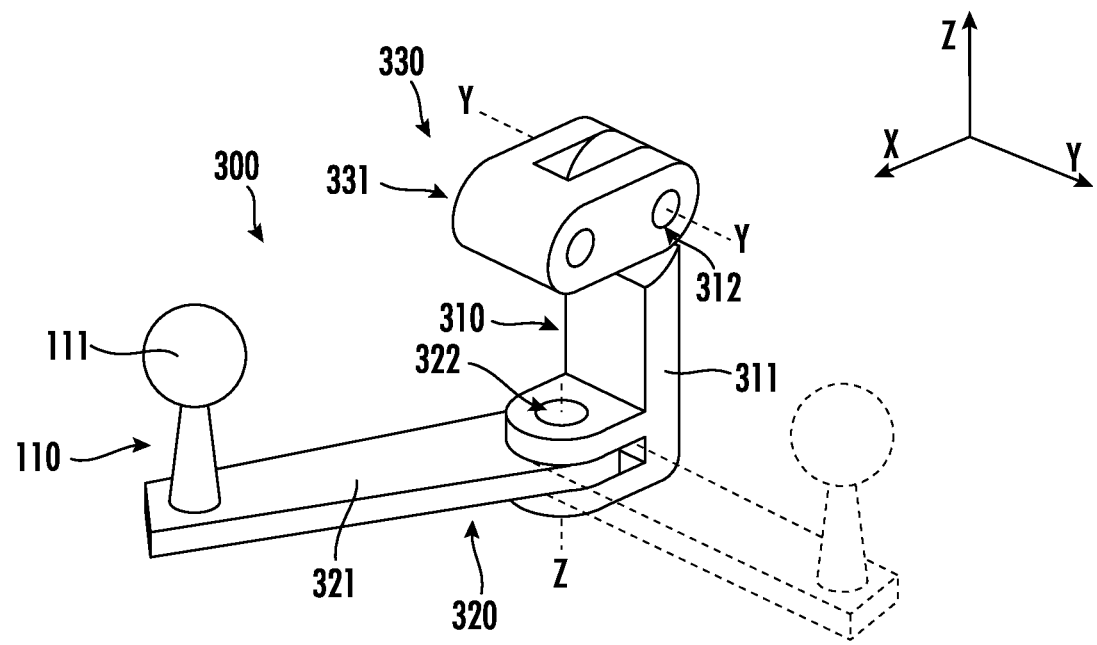

Reference is now made to FIG. 8 showing a further embodiment of the trailer coupling assembly 300. In this embodiment, the tow bar 110 is, as in the embodiment of FIG. 7, arranged extending in a perpendicular direction at free end of the main body 321 of the first additional intermediate connection device 320. As described above, the second additional intermediate connection device 330 is arranged to support structure 130 of the vehicle 100 via a fastening device (not shown) at one end via the rotational interface 331, enabling rotation about the Y-axis of the vehicle 100. The intermediate connection device 310 is in this embodiment, by one of its ends, arranged to the other end of the second additional intermediate connection device 330 via the rotational interface 312, wherein the rotational interface 312 also enables rotation about the Y-axis of the vehicle 100.

Accordingly, both the rotational interfaces 312 and 331 provide movability in the vertical direction (Z-axis). The first additional intermediate connection device 320 is in this embodiment also arranged to the other end of the intermediate connection device 310 by means of the rotational interface 322. The first additional intermediate connection device 320 is arranged extending in perpendicular direction of the intermediate connection device 310, wherein the rotational interface 322 is providing a rotation about the Z-axis; i.e., in the horizontal X-Y plane, providing a pendulum movement of the main body 321 of the first additional intermediate connection device 320 and thus tow bar 110. The rotational interfaces 312 and 331 also provide movement of the parts connected thereto in the longitudinal direction (X-axis) of the vehicle 100 by their rotation about the Y-axis.

The embodiment of FIG. 8 also provides the function of moving the tow bar 110 between a "hidden" position where it is retracted in/underneath the vehicle 100 and a towing position where it is protruding from the vehicle 100.

Figure 9A:
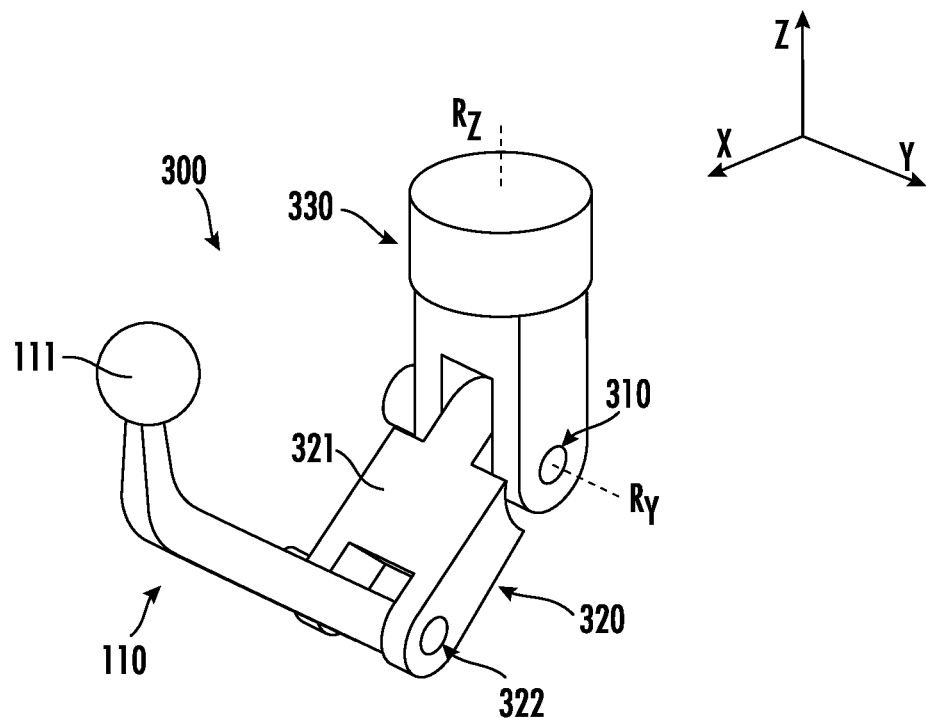
FIGS. 9A and 9B are principle drawings of a further embodiment of the disclosed trailer coupling assembly.
Figure 9B:
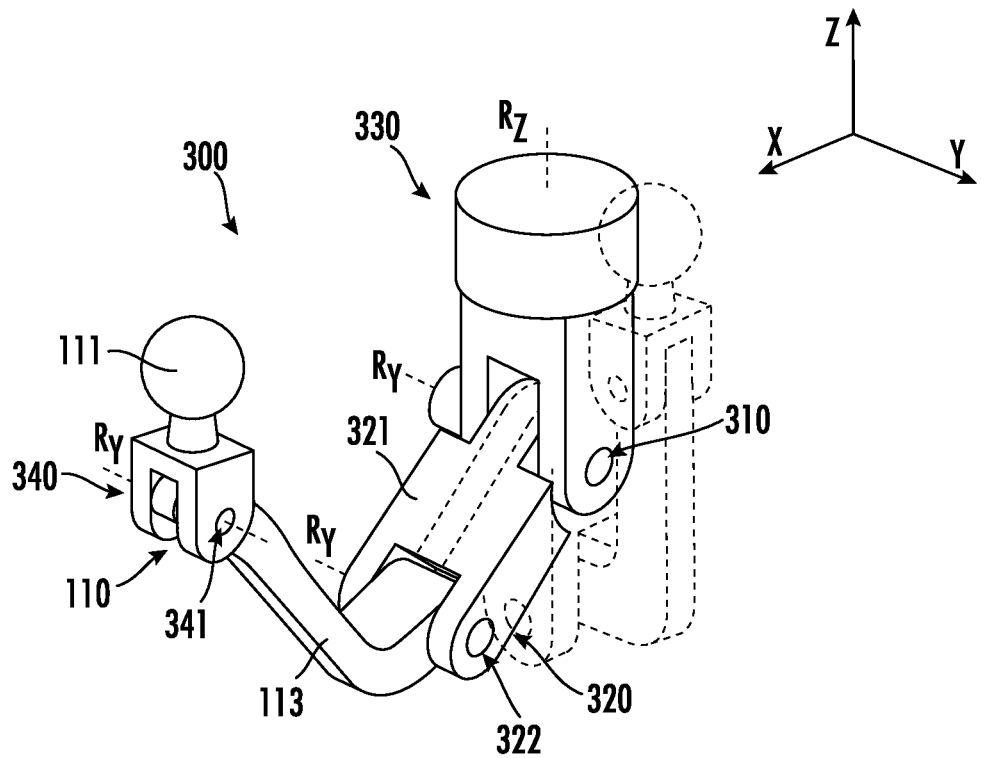

Reference is now made to FIGS. 9A and 9B showing a further alternative embodiment of the trailer coupling assembly 300. The shown embodiment is similar to the embodiments described in FIGS. 4A-4C with regard to the arrangement of the intermediate connection device 310 and the first 320 and second 330 additional intermediate connection devices. In this embodiment, the first additional intermediate connection device 320 is arranged to the tow bar 110 via the rotational interface 322 at the free end of the main body 321 thereof, providing rotation about the Y-axis of the tow bar 110. Accordingly, both the intermediate connection device 310 and the first additional intermediate connection device 320 provide movability in the vertical direction (Z-axis). In addition, they collectively provides movement of the tow bar 110 and thus hitch ball 111 in the longitudinal direction (X-axis) of the vehicle 100.

In the embodiment of FIG. 9B, the hitch ball 111 is arranged to a main arm 113 of the tow bar 110 via a third additional intermediate connection device 340 with a rotational interface 341 that in combination with the intermediate connection device 310 and the first additional intermediate connection device 320 provide improved movability of the tow bar 110 and thus hitch ball 111 in the vertical direction (Z-axis) as well as in longitudinal direction (X-axis) of the vehicle 100.

The embodiments of FIGS. 9A and 9B also provide the function of moving the tow bar 110 between a "hidden" position where it is retracted in/underneath the vehicle 100 and the towing position where it is protruding from the vehicle 100.

Figure 10:
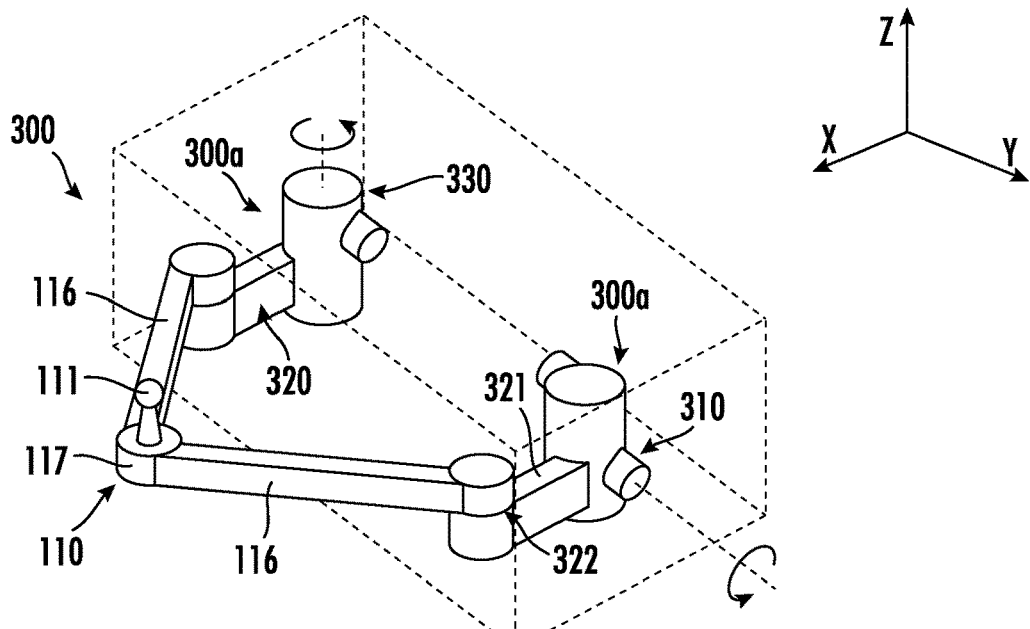
FIG. 10 is a principle drawing of a further embodiment of the disclosed trailer coupling assembly.

Reference is now made to FIG. 10, showing a further example embodiment providing the tow bar 110 with multiple degrees of freedom. This is achieved by combining the principles described above into the same embodiment. In this embodiment, the tow bar 110 is formed by link arms 116 connected to each other at one end by a pivoting or rotatable connection 117 and wherein the hitch ball 111 is arranged to the pivoting or rotatable connection 117 that may or may not be provided with a controllable rotational interface. Each link arm 116 is arranged at the other end to separate modules 300a of the trailer coupling assembly 300, wherein the modules 300a comprises one or more of the features of the above described embodiments, enabling movement of the hitch ball 111 in at least the vertical and/or longitudinal direction(s) of the vehicle 100, as well as in the horizontal X-Y plane.

The embodiment of FIG. 10 also provides the function of moving the tow bar 110 between a "hidden" position where it is retracted in/underneath the vehicle 100 and a towing position where it is protruding from the vehicle 100.

Figure 11A:
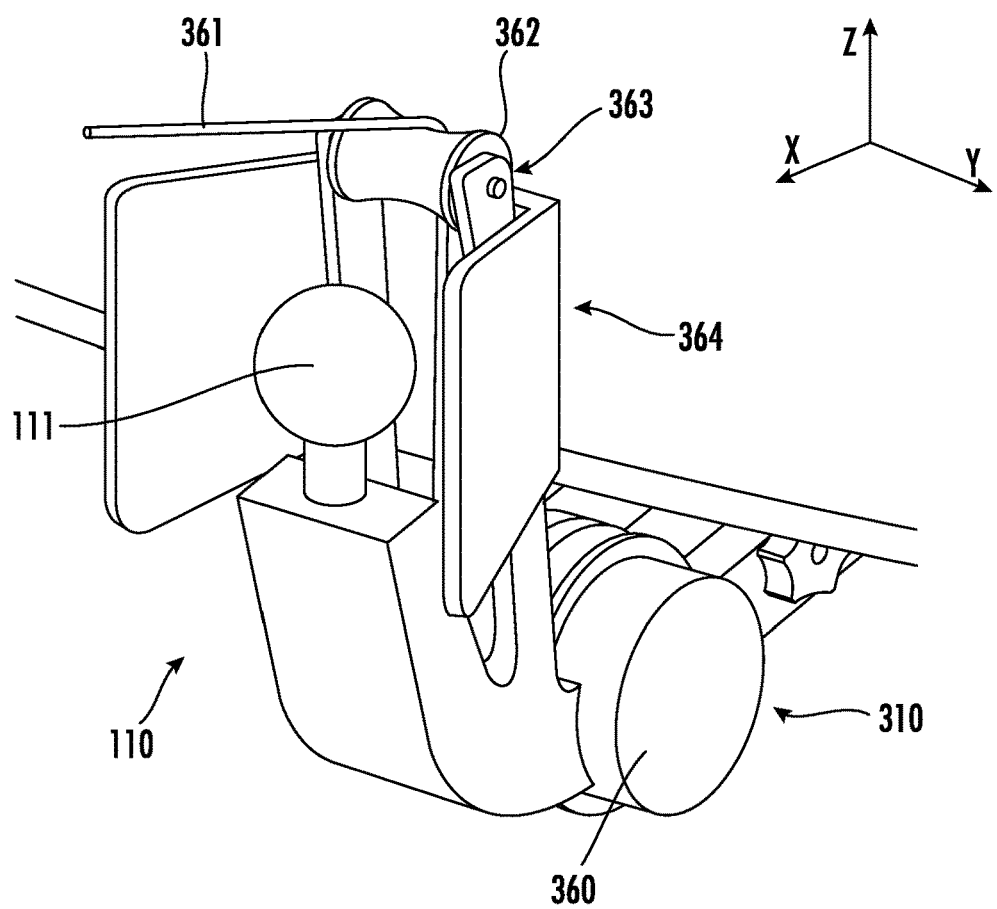
FIGS. 11A and 11B are principle drawings of an alternative embodiment of the disclosed trailer coupling assembly.
Figure 11B:
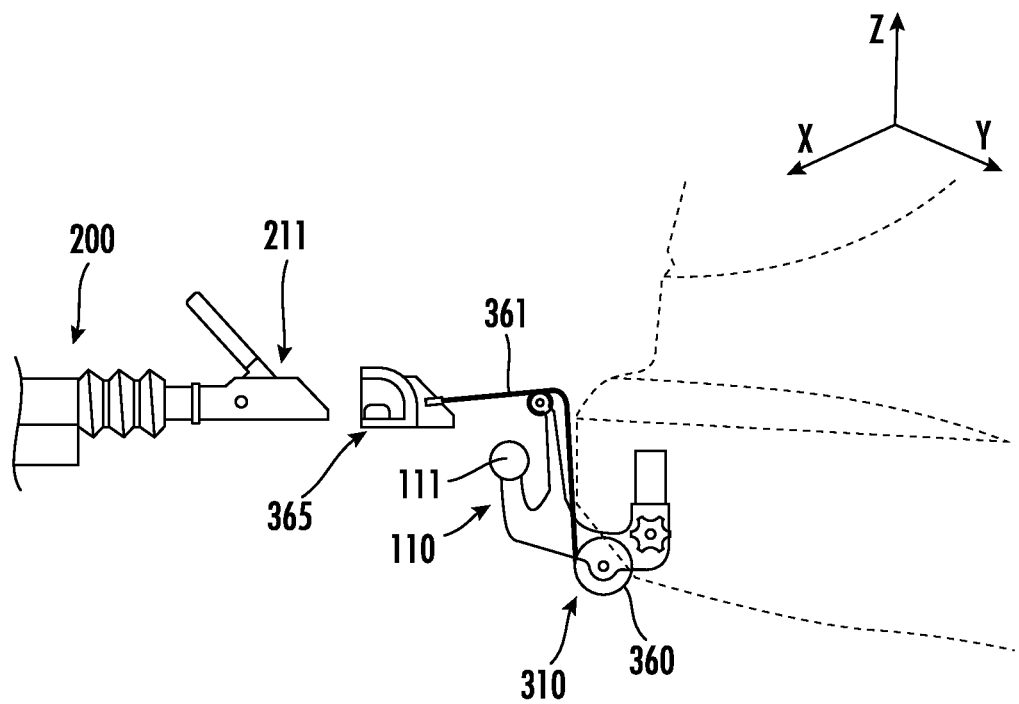

Reference is now made to FIGS. 11A and 11B showing an alternative embodiment wherein the trailer coupling assembly 300 comprises an intermediate connection device 310 in the form of a winch 360 integrated with the tow bar 110 of a vehicle 100. The intermediate connection device 310 further comprises a wire 361 wound on a winch drum running over a pulley 362 positioned above the hitch ball 111 by a support 363. For consistent and reliable connection, it may further be provided with a guide funnel 364 arranged to the support 363, between the vehicle 100 and the hitch ball 111, for guiding the connection head/trailer hitch 211 into connection with the hitch ball 111.

For connection to a trailer 200, the wire 361 is deployed from the winch 360 and connected to the connection head/trailer hitch 211, either directly or via an adapted connection device 365, and the wire 361 is reeled in onto the winch 360, pulling the trailer 200 towards the tow bar 110 and into contact with the hitch ball 111 for safe connection therewith.

Figure 12A:
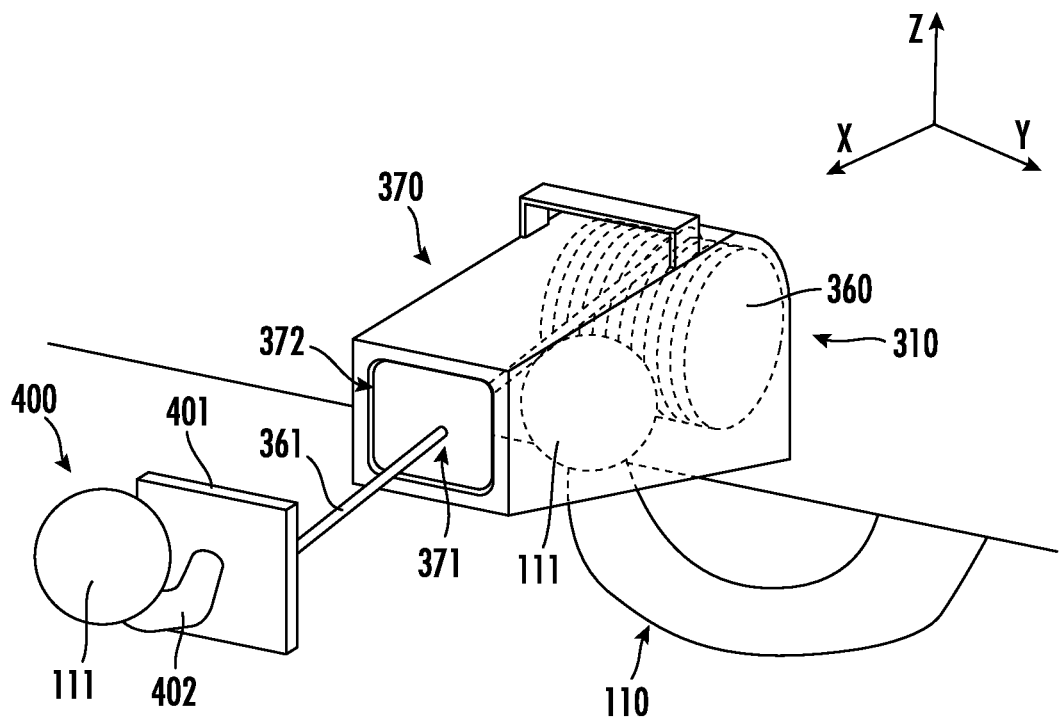
FIGS. 12A and 12B are principle drawings of a further alternative embodiment of the disclosed trailer coupling assembly.
Figure 12B:
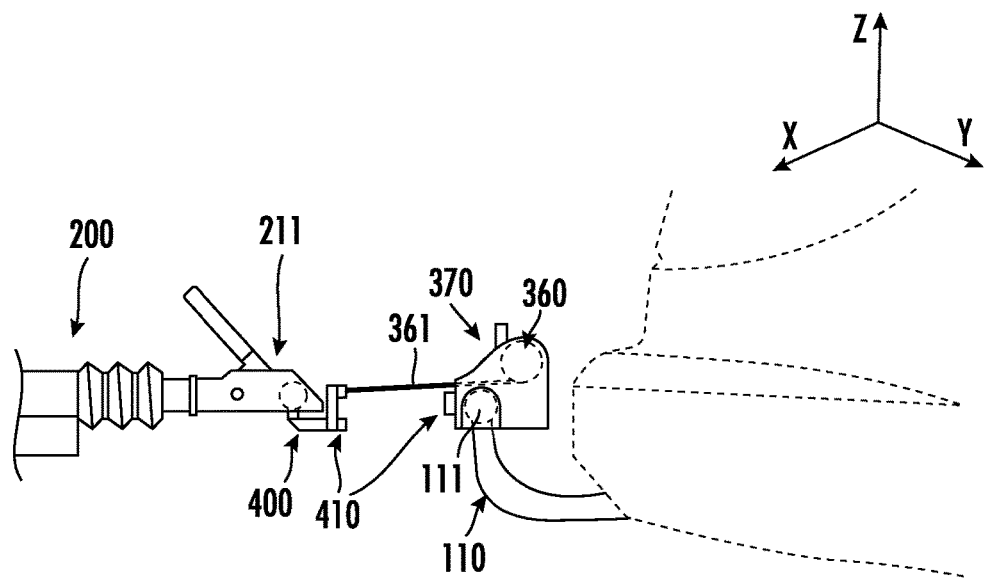

Reference is now made to FIGS. 12A and 12B showing a further embodiment of the trailer coupling assembly 300 that is detachable to the tow bar 110. The trailer coupling assembly 300 comprises an intermediate connection device 310 comprising a support body 370 provided with means for securing attachment (not shown) to the tow bar 110 via the hitch ball 111. The intermediate connection device 310 further comprises a winch 360 arranged to the support body 370, and a winch wire 361 running through a hole or slot 371 of the support body 370 wherein it is connected to a hitch ball assembly 400. The hitch ball assembly 400 is formed by a main body 401 adapted to be received and accommodated in a recess 372 of the support body 370 enclosing the hole or slot 371, and which on the other side of the of the attachment of the wire 361 is provided with a hitch ball 111 attached to the main body 401 by a mainly L-shaped rod 402. The main body 401 and support body 370 are preferably at facing sides provided with corresponding guiding means 410 for securing attachment of the hitch ball assembly 400 to the support body 370. In connection with the guiding means, it is also preferably arranged locking means for safe attachment of the hitch ball assembly 400 to the support body 470.

The hitch ball assembly 400 will in use be attached to the connection head/trailer hitch 211 by deployment of the wire 361. After attachment to the connection head/trailer hitch 21 of the trailer 200, the wire 361 is reeled in, pulling the trailer 200 towards the vehicle 100 until the hitch ball assembly 400 is in secure contact with the support body 370, and secured thereto.

The use of a winch 360 provides the trailer coupling assembly 300 with the possibility to move the trailer in transversal direction (Y-axis), as well as in the vertical direction (Z-axis) and in longitudinal direction (X-axis) in connection with attachment of a trailer 200 to a vehicle 100.

Figure 13:
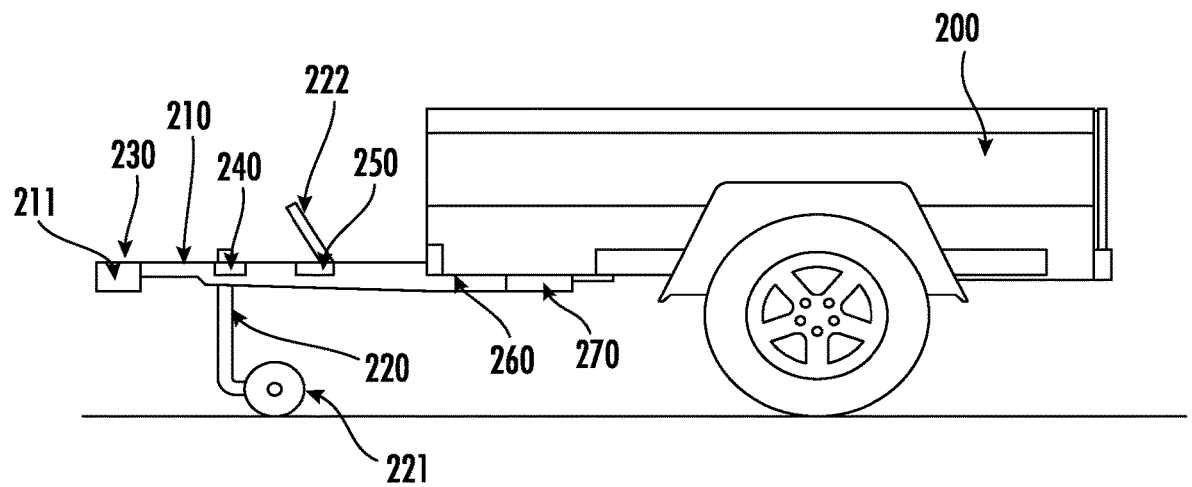
FIG. 13 is a principle drawing of an automated trailer according to prior art.

Reference is now made to FIG. 13 showing a principle drawing of a trailer 200 with smart functionality that will be advantageous to use with the disclosed embodiments. The trailer 200 is preferably provided with means providing features for becoming an automated trailer 200 that in a semi-automated or automated manner is ready for use when being connected to a vehicle 100, and furthermore, in a semi-automated or automated manner is ready for parking when being disconnected from a vehicle 100.

In addition to connecting the trailer 200 to the tow bar 110 of the vehicle 100, the power cord has to be connected, the parking brakes has to be released and the support means 220 have to be raised, if the trailer 200 is equipped with these features. As described above, the trailer coupling assembly 300 deals with many of these issues, but to be able to solve all these issues it is required that the trailer 200 is provided with some semi-automated or automated features, which will be discussed below, such that after the physical connection or disconnection of the trailer 200 and vehicle 100 is achieved, also other features of the trailer 200 may be connected or disconnected in a semi-automated or automated manner.

It will be favorable that the trailer 200 is at least able to raise or lower the support means 220. It will further be preferable that the trailer 200 is able to engage or disengage the parking brake(s) when connected to the tow bar 110. It will further be preferable that the power cord also can be connected and disconnected semi-automatically or automatically.

According to one embodiment, the trailer comprises means 230, such as at least one switch or sensor or similar, for indicating correct attachment of the trailer 200 to the tow bar 110. Alternatively, these means 230 may be arranged in connection with the tow bar 110 of the vehicle 100. In an alternative embodiment, the trailer 200 is provided with a connection head/trailer hitch 211 with a controllable locking mechanism (not shown) for semi-automated or automated safe connection and disconnection of the trailer to the tow bar 110, being capable of providing a signal indicating correct attachment and disconnection. An example of a controllable locking mechanism for safe connection of the connection head/trailer hitch 211 to the hitch ball 111 may comprise a spring-loaded locking element, movable between a locking position and connection position. The spring-loaded locking element is, e.g., adapted to bend away from the locking position to the connection position when the connection head/trailer hitch 211 engages the hitch ball 111, allowing the hitch ball 111 to be properly received and accommodated in the connection head/trailer hitch 211. When the hitch ball 111 is in correct position in the connection head/trailer hitch 211, the locking element, due to the spring-force will go into locking position, safely retaining the connection head/trailer hitch 211 to the hitch ball 111 of the tow bar 110 by retaining from the lower side of the hitch ball 111. To release the safe connection the spring-loaded locking element, when the connection is to be removed, the spring-loaded locking element is, e.g., arranged to an electric or manual actuator that applies a force to the spring-loaded locking element moving it into the connection position, wherein the locking element allows the hitch ball 111 to move freely out of the connection head/trailer hitch 211. In an alternative embodiment, the locking element is operated between the locking position and the connection position exclusively by the use of the manual or electric actuator. The actuator may be controlled from a control unit 150 of the vehicle 100 or control unit 260 of the trailer 200 or from a handheld device, such as a tablet, smartphone or similar, if wireless communication is arranged. Other suitable solutions will be obvious for a skilled person.

For raising and lowering the support means 220, the trailer 200 will be provided with at least one actuator 240, such as a cylinder, worm screw, shaft with gear or similar, driven by an electric motor (not shown) that is in engagement with corresponding means (not shown) arranged in the support means 220, enabling raising and lowering of the support means 220 by activating the at least one motor.

For engaging or disengaging the parking brakes, the trailer 200 is provided with a control mechanism 250 arranged to the parking brakes. The control mechanism 250 may, e.g., be an electric motor (not shown) with a shaft arranged to operate the parking brake handle 222 if the brakes are mechanically operated.

In an additional embodiment, there can also be means for attaching signal cables 420/power cord (FIG. 14) for lights etc. on the trailer 200. As an alternative solution, all communication between the trailer 200 and the vehicle 100 can also be wireless by that both the vehicle 100 or trailer coupling assembly 300 and trailer 200 are provided with corresponding wireless communication means.

The trailer 200 or the vehicle 100 will further be equipped with a control unit 260 provided with means and/or software for controlling the at least one actuator 240, control mechanism 250, as well as means for attaching signal cables 420/power cord, if present.

According to one embodiment of the trailer 200, the trailer 200 is provided with at least one power source 270, such as one or more batteries, arranged on the trailer 200 for powering the mentioned means/features of the trailer 200, as discussed above. In an alternative embodiment, means (wires, cables) are used for transferring energy from the vehicle 100 to the trailer 200 for powering the mentioned means/features, or alternatively wireless means can be used for transferring energy for charging of the at least one power source 270.

The trailer 200 may further be provided with a reversing camera 120 or proximity sensor 121 or similar sensor systems, such as laser, laser radar, LIDAR, LADAR, etc., similar to the ones shown in FIG. 2 for the vehicle 100. These devices/systems can be automatically activated during reversing when the trailer 200 and the vehicle 100 are connected, providing information of the surroundings of the trailer 200 when connected to the vehicle 100. The signals from these devices/systems can be programmed to override any similar devices mounted on the vehicle 100 when the trailer 200 is connected to the vehicle 100. The signals are transferred to the cabin of the vehicle 100 during reversing when the trailer 200 and the vehicle 100 are connected. During forward driving, no such signals are usually required transmitted to the cabin of the vehicle 100 from these devices/systems, but in some case, such as when passing tight corners, it might be valuable for driver to receive information from such devices/systems for maneuvering the vehicle 100 and the connected trailer 200.

Reference is now made to FIG. 14 showing a block diagram of how the trailer coupling assembly 300 is controlled. For controlling the trailer coupling assembly 300, the vehicle 100 will be provided with at least one proximity sensor 121 and/or camera 120, or similar systems like laser, laser radar, LIDAR, LADAR, etc., arranged at the rear end of the vehicle 100. At least one camera 120 may be a separate camera or combined with a reversing camera. The sensor may be proximity sensors 121, distance sensor or similar.

The vehicle 100 will further be provided with a dedicated control unit 150 provided with means and/or software for processing information from the at least one sensor 121 and/or camera 120, as well as controlling the components of the trailer coupling assembly 300. In an alternative embodiment, the features of the control unit 150 are integrated in an onboard control unit, such as an infotainment system, present in the vehicle 100.

Images captured by the at least one camera 120 and/or sensor signals from the at least one sensor 121 are sent to the control unit 150 that processes the images and/or sensor signals to provide relative positioning information between the vehicle 100 and a parked trailer 200. To be able to provide relative positioning information between the vehicle 100 and thus the tow bar 110 and the connection head/trailer hitch 211 of the parked trailer 200, use of at least two sensors or sensor systems is required; i.e., it is required at least two cameras 120, at least two proximity sensors 121, at least two lasers or laser radars or LIDARs or LADARs, etc. or the use of at least two of the mentioned systems providing at least two measurements from at least two different positions at rear end of the vehicle 100 to be able to perform data triangulation. For example, one may use information from at least one camera 120 and at least two proximity sensors 121 that are available options on most of today's vehicles 100.

The use of at least one camera 120 would be required to identify that a trailer 200 and thus connection head/trailer hitch 211 is present in the vicinity of the vehicle 100. By using, e.g., image recognition the connection head/trailer hitch 211 may be identified and the use of at least two proximity sensors 121, which are arranged with a fixed distance therebetween at rear end of the vehicle 100, will provide distance measurements to the identified connection head/trailer hitch 211.

The dedicated control unit 150, or vehicle onboard control, unit will accordingly be provided with image recognition software to be able to recognize a connection head/trailer hitch 211 from the images provided by the at least one camera 120 or that the user (driver), by means of an active operation, identifies the connection head/trailer hitch 211 on a screen 140 in the vehicle 100. The proximity sensors 121 can then be used to calculate the relative positioning between the vehicle 100, and thus tow bar 110 and the connection head/trailer hitch 211.

The dedicated control unit 150 or vehicle onboard control unit may further be provided with machine learning (artificial intelligence (AI)) or in communication with a central server provided with machine learning (artificial intelligence (AI)) to improve the recognition process relative to different trailers 200. By the use of machine learning (artificial intelligence (AI)), the dedicated control unit 150 or vehicle onboard control unit will be able to perform the recognition faster and more precisely. By machine learning (artificial intelligence (AI)), one could also identify other properties of the trailer 200, such as with which additional semi-automated or automated features the trailer 200 may be equipped, such as wired or wireless transfer of energy and/or signals, as well as relative positioning according to these features.

Further, by allowing dedicated control units 150 or vehicle onboard control units of different vehicles 100 to communicate with a central server, information of trailers 200 and connection and disconnection may be analysed to improve the connection and disconnection process, such as how to optimally approach a parked trailer 200 for connection.

After the connection head/trailer hitch 211 has been identified, the images captured by the at least one camera 120 can be displayed on a screen 140 inside the vehicle 100, if present. The image displayed on the screen 140 may have guidelines. These guidelines can aid in telling when the vehicle 100 and parked trailer 200 are positioned within the working radius of trailer coupling assembly 300 for connecting the trailer 200 to the vehicle 100; i.e., within the movability range of the trailer coupling assembly 300. The guidelines may be in the form of digitally constructed lines, which are added to the images captured by the at least one camera 120. Other guiding devices could also be used.

Accordingly, by means of the information captured by the camera 120 and/or proximity sensors 121, a driver of the vehicle 100 manually back the vehicle 100 into position relative to the parked trailer 200, or if the vehicle 100 is provided with automated features for this, the vehicle 100 performs automated or semi-automated reversing into position relative to the parked trailer 200 based on the calculated relative positions. When the vehicle 100 is in position relative to the parked trailer 200, the brakes of the vehicle 100 are preferably activated, and the dedicated control unit 130 or vehicle onboard control unit is activated to control the trailer coupling assembly 300. By controlling the intermediate connection device 310 and the one or more additional intermediate connection devices 320-340, if present, the hitch ball 111 is positioned under the connection head/trailer hitch 211, and the hitch ball 111 is further moved into safe connection with the connection head/trailer hitch 211.

When safe connection of the tow bar 110 and trailer 200 is achieved, the support means 220 is to be raised, if present. If the trailer 200 is provided with automated or semi-automated means for this, as described above, the trailer control unit 260 controls the actuator 240 to raise the support means 220 after detection by the means 230, indicating correct attachment. In an alternative embodiment, both the trailer 200 and vehicle 100 are provided with wireless communication means, wherein the signal from the means 230 or controllable locking mechanism is transferred to the dedicated control unit 150 or integrated vehicle onboard control unit that controls the actuator 240 to raise the support means 220. This feature can also be applied to support pillars if the trailer 200 has these.

When the support means 220 are raised, if present, the trailer control unit 260 or dedicated control unit 150 or vehicle onboard control unit deactivates the parking brake control mechanism 250 to release the parking brakes of the trailer 200.

After the parking brakes are disengaged, the trailer coupling assembly 300 will move to a secure towing position, which will be a defined position with regards to towing safety, hereunder optimal load distribution/transfer into the structure of the vehicle 100, and lock the trailer coupling assembly 300 in this position.

Accordingly, in the case where the trailer coupling assembly 300 is provided with only the intermediate connection device 310, enabling movement in the vertical direction of the tow bar 110, one will thus use the vehicle 100 to position the tow bar 110 in the X-Y plane relative to the connection head/trailer hitch 211, such that it is positioned within the working range in the vertical direction (Z-axis), as well as in longitudinal direction (X-axis) and/or transversal direction (Y-axis) for some of the embodiments of the trailer coupling assembly 300 described above, before activating the trailer coupling assembly 300 to engage with the connection head/trailer hitch 211. Accordingly, the positioning system of the vehicle 100 must be sufficient accurate to allow positioning of the vehicle 100 before engagement with trailer 200 may be activated if semi-automated or automated system are used for reversing the vehicle 100, and driver skills if the driver manually is reversing the vehicle 100. This may also be performed in a semi-automatic manner, wherein the driver is provided with a position area in a display in the vehicle, wherein the driver positions the vehicle in accordance to the provided position area by manually backing the vehicle. When the vehicle is in position in the area, the trailer coupling assembly 300 is activated, as described above. If the trailer coupling assembly 300 is provided with additional intermediate connection device 320-340, this will allow for connection to the trailer 200 from a remote distance with the working range of the intermediate connection device 310 and the one or more additional intermediate connection devices 320-340. Accordingly, when increased movability is enabled in transversal direction (Y-axis) and/or longitudinal direction (X-axis) and/or horizontal plane in addition to the vertical direction (Z-axis), the requirement of accurate positioning of the vehicle 100 relative to the connection head/trailer hitch 211 is reduced.

E.g., when the trailer coupling assembly 300 is arranged for movability in the longitudinal direction (X-axis) of the vehicle 100, this enables, after safely connecting the trailer 200 to the tow bar 111, pulling of the trailer 200 towards the vehicle 100. When the trailer coupling assembly 300 is positioned in the defined secure towing position, which will be a defined position with regards to towing stability, hereunder optimal load distribution/transfer, of the vehicle 100, the trailer coupling assembly 300 is locked in this position.

Accordingly, the more degrees of freedom for movement enabled in the trailer coupling assembly 300, the less accurate positioning of the vehicle 100 is required. Moreover, this will enable connections to parked trailers 200 that may not be parked in optimal positions for connection to the vehicle 100, such as the connection head/trailer hitch 211 being at low height above the ground level.

If the trailer 200 is provided with wireless communication means, the signals controlling the lights may be sent wirelessly to the trailer control unit 260.

The signals controlling the lights can also optionally be sent via a wire. In this solution, the trailer coupling assembly 300 and connection head/trailer hitch 211 may be provided with corresponding couplings transferring the signals when connected. The coupling can potentially be as a part of the hitch ball 111 and connection head/trailer hitch 211, respectively, such that when they are connected a stable and proper connection is achieved. Alternatively, the connection may be provided by the use a male and female contact arranged in connection with the trailer coupling assembly 300 and connection head/trailer hitch 211, respectively. In a further alternative, the trailer coupling assembly 300 or trailer 200 may be provided with a separate actuator or manipulator arm (not shown) for performing the connection of the corresponding couplings when the trailer coupling assembly 300 is in a secure towing position.

Figure 16:
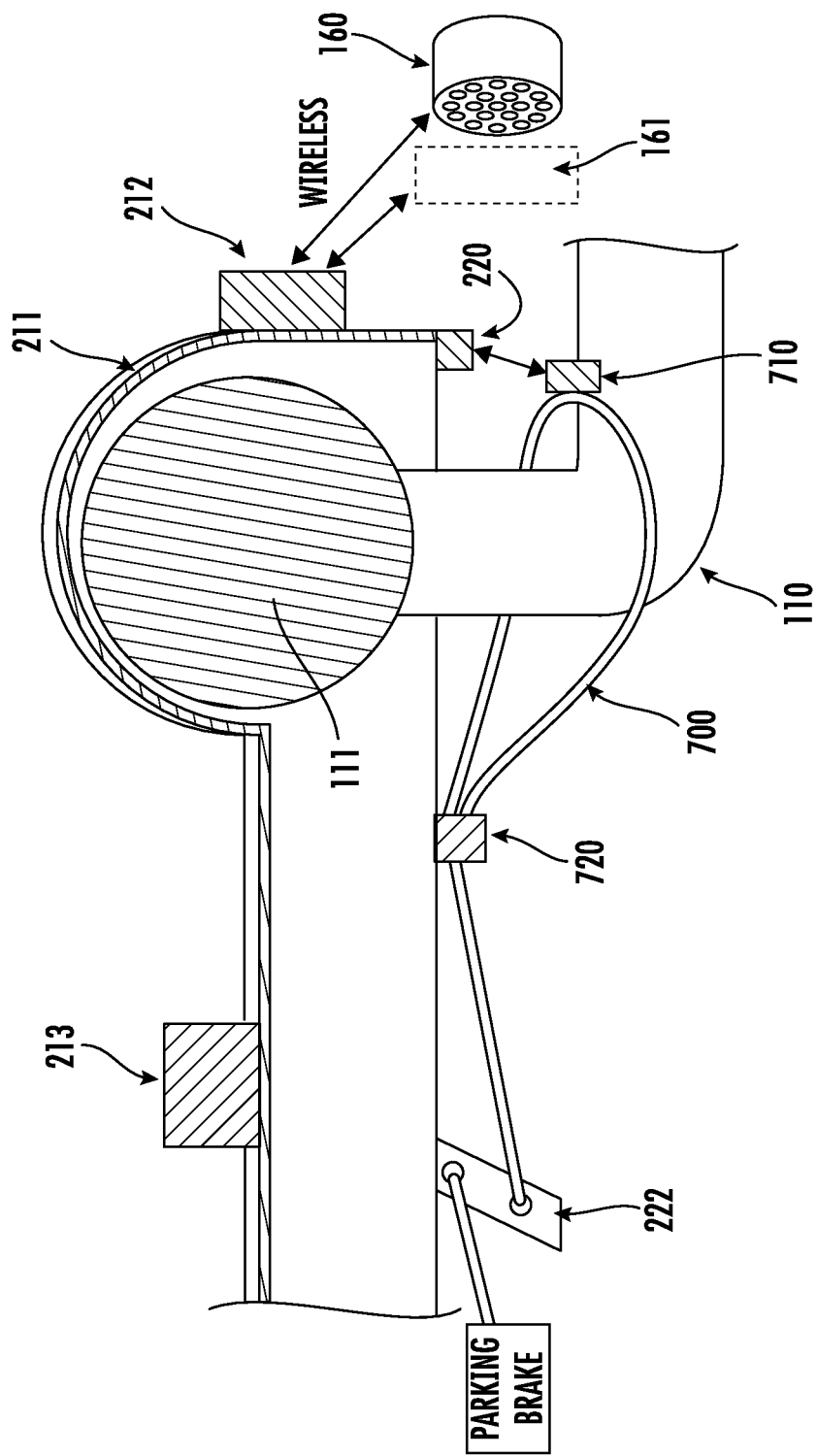
FIG. 16 is a principle drawing of automated attachment of safety wire, chain or similar and wireless connection for transfer of energy and/or signals.

For connection between passenger vehicles 100 and trailers 200 with brakes, it is common to use a safety wire 700, chain or similar means. The connection of this safety wire 700, chain or similar means can also be done automatically or semi-automatically. One solution could be using a safety wire 700, chain or similar means that is attached to the trailer 200 and is dropped down into a receiving device (not shown) arranged in connection with the trailer coupling assembly 300, when the trailer coupling assembly 300 and trailer 200 are connected. Alternatively, the safety wire 700, chain or similar means can be connected between the vehicle 100 or trailer coupling assembly 300 and trailer 200 by an actuator or manipulator arm 430. A further alternative embodiment for automated connection of the safety wire 700, chain or similar means is shown in FIG. 16. In FIG. 16 is shown a principle drawing of an embodiment providing wireless transfer of electric energy and signals between the trailer 200 and the vehicle 100. In the shown embodiment a vehicle outlet 160 is arranged at rear end of the vehicle 100 adapted for wireless transfer of energy and signals or an adapter 161 adapted for wireless transfer of energy and signals is connected to the vehicle outlet 160.

The connection head/trailer hitch 211 is further provided with a corresponding wireless unit 212 adapted for receiving the wirelessly transferred electric energy and signals from the adapter 161 or vehicle outlet 160. The wireless unit 212 of the connection head/trailer hitch 211 may also be adapted for transfer of signals to the vehicle outlet 160 to report status of the trailer 200, such as status of batteries (of present), defect lights, errors and similar.

The wireless unit 212 of the connection head/trailer hitch 211 is connected to a connection box 213, e.g. by wire, for the lights on the trailer and to back up batteries, if present. By using LED lamps on the trailer 200, the requirement for electric energy will be low, such that the wireless transfer of electric energy will be high enough for powering the LED. However, in some embodiments it will be favorable to have at least one battery (not shown) arranged on the trailer 200, either as back-up power, or such that the wirelessly transferred energy is used for charging the at least one battery, which can be used to power the LEDs. The metal of the tow bar 110 or the trailer 200 may be used as ground for the electric circuit.

In the shown embodiment is further shown a solution for automated attachment and detachment of the safety wire 700, chain or similar. In the shown embodiment the safety wire 700, chain or similar is provided with at least one magnet 710 at a side thereof facing the tow bar 110 of the vehicle 100. The embodiment further comprises at least one electromagnet 220 arranged at the end of the connection head/trailer hitch 211 facing the tow bar 110 of the vehicle 100, wherein the at least one electromagnet 220 is connected to the electrical circuit of the trailer 220, such that when the trailer 200 is connected to the tow bar 110 of the vehicle 100 and the trailer 200 is electrically connected to the vehicle 100, either by wire or wirelessly, such that there is an electrical connection therebetween, the electromagnet is adapted to be demagnetized. Accordingly, in the shown embodiment the electromagnet 220 is arranged to be magnetized when the electrical circuit between the trailer 200 and vehicle 100 is disconnected, and in this manner retain the at least one magnet 710 and thus safety wire 700, chain or similar in a disconnected position. When the electric circuit between the trailer 200 and vehicle 100 is connected, the magnetic force acting between the electromagnet 220 and at magnet 710 of the safety wire 700, chain or similar is deactivated, resulting in that the safety wire 700, chain or similar falls down onto the tow bar 110, as shown in FIG. 16. In this manner, an automated connection of the safety wire 700, chain or similar is achieved.

If the magnetic force acting between the at least one electromagnet 220 and magnet 710 on the safety wire 700, chain or similar is high enough, an automated disconnection of the safety wire 700, chain or similar may be achieved by activating the at least one electromagnet 220 which will retract the at least one magnet 710 of the safety wire 700, chain or similar, which thus will lift the safety wire 700, chain or similar free of the tow bar 100. In this manner, an automated disconnection of the safety wire 700, chain or similar is achieved.

The movement of the safety wire 700, chain or similar may further be facilitated by arranging retraction actuator 720 at lower side of the connection head/trailer hitch 211 capable of assisting in movement of the safety wire 700, chain or similar from connected to disconnected position. The retraction actuator 720 may e.g. be spring-based and connected to the trailer brake such that when the trailer brake is activated, the trailer brake affects the spring-based retraction actuator 720 such that safety wire 700, chain or similar is lifted from the tow bar 110. In an alternative embodiment the retraction actuator 720 is a linear actuator that is adapted to operate when the electric circuit between the trailer 200 and vehicle 100 is disconnected as discussed above.

In a further alternative embodiment, the mentioned electromagnet 220 is adapted to work with same magnetic field as the magnet 710 of the safety wire 700, chain or similar when the electric circuit between the trailer 200 and vehicle 100 is connected. The magnets 220 and 710 will thus reject each other. When the electric circuit between the trailer 200 and vehicle 100 is disconnected, the electromagnet 220 and magnet 710 of the safety wire 700, chain or similar is arranged to retract each other. Accordingly, when the electric circuit between the trailer 200 and vehicle 100 is connected the magnet 710 and thus safety wire 700, chain or similar will be pushed downwards related to the connection head/trailer hitch 211 and pushed onto the tow bar 110.

In combination with a spring-based retraction actuator 720, the rejecting magnetic force of the magnets 710, 220 is preferably higher than the spring force of the spring-based retraction actuator 720.

According to a further embodiment, the spring-based retraction actuator 720 can further partly or entirely be activated and/or deactivated by the trailer brake or actuators in in connection with the trailer brake.

According to a further embodiment, the safety wire 700, chain or similar is provided with a rigid section, at least a part thereof, to facilitate the lifting of the safety wire 700 from the tow bar 110.

It will preferably be arranged interlocking means such that operation of the safety wire 700, chain or similar can only be performed when the trailer brake is in activated position to prevent disconnection of the safety wire 700, chain or similar during driving or other dangerous or unwanted situations.

Accordingly, provided herein are solutions for automated connection and disconnection of the safety wire 700, chain or similar. As shown by the few examples above, this may be achieved by means of the use of electromagnet(s) and possibly a retraction actuator.

Similarly, if the trailer 200 is provided with pneumatic or hydraulic brakes, pneumatic or hydraulic hoses may be automatically connected to the corresponding connections arranged in the vehicle 100 by means of an actuator or manipulator arm. Is such a case, the connection will have to be performed while the trailer coupling assembly 300 is safely attached to the trailer 200 to enable movement (pulling) of the trailer 200, if movement in the longitudinal direction of the trailer 200 is to be performed, as for some of the embodiments described above.

When disconnecting the trailer 200 from the vehicle 100, the driver positions the trailer 200 in parked position. The driver then activates the trailer coupling assembly 300 to perform a reversed action of the connection process described above. There are, however, several alternatives for performing the disconnection.

E.g., the parking brakes of the trailer 200 are first activated, the support means 220 are lowered, the safety wire or chain and signal coupling are disconnected, and the trailer coupling assembly 300 is released from engagement with the connection head/trailer hitch 211 by initiating a downwards vertical movement. Alternatively, the trailer coupling assembly 300 is released from engagement with the connection head/trailer hitch 211 by elevating the connection head/trailer hitch 211 by means of the support means 220 after the locking mechanism has been disengaged, to release the connection between the hitch ball 111 and connection head/trailer hitch 211. The vehicle 100 is then free to move away from the parked trailer 200.

In another alternative, the trailer coupling assembly 300, before or after disconnection of the signal connection and safety wire or chain, moves the trailer 200 in longitudinal direction away from the vehicle 100 before the parking brakes are activated, and the support means 220 lowered and, finally, the trailer coupling assembly 300 is released from engagement with the connection head/trailer hitch 211, as described above.

After the trailer coupling assembly 300 is released from engagement with the connection head/trailer hitch 211, the trailer coupling assembly 300 may return to the towing position or to a position retracted into/underneath the vehicle 100, as described above.

It is important to activate the parking brakes before the support means 220 are lowered and disconnection is performed for safety reasons.

If the trailer 200 is not provided with semi-automated or automated features for support means 220, parking brake, safety chain and/or connection of signals, these will have to be performed manually in connection with the above-described connection and disconnection processes.

Figure 15:
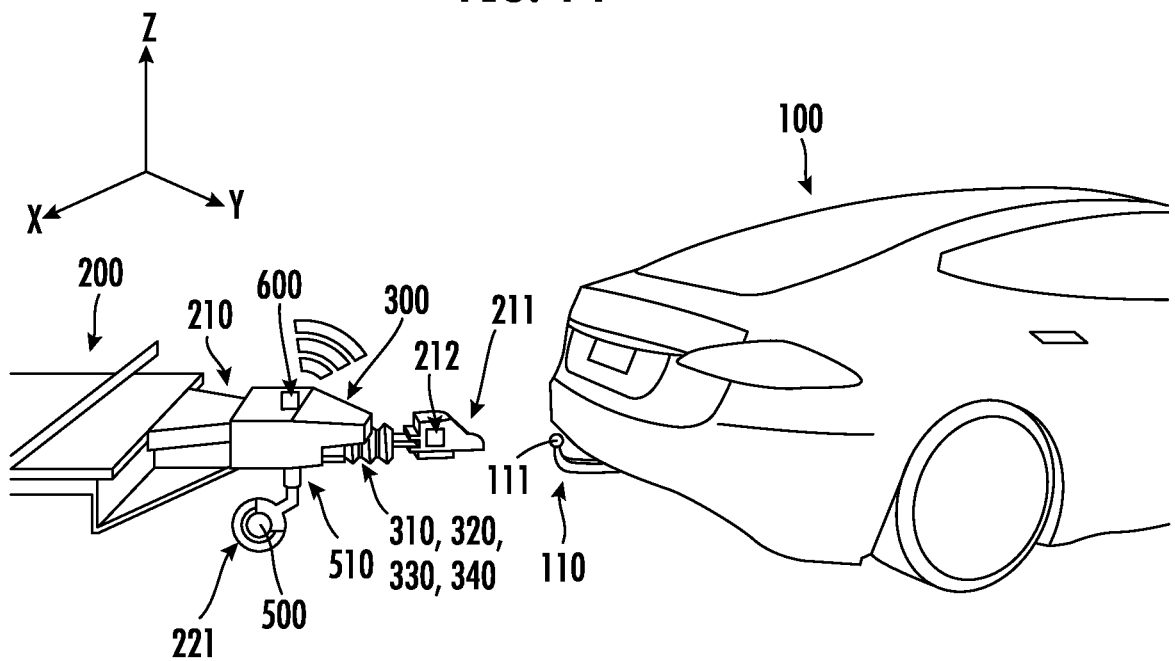
FIG. 15 is a principle drawing of an automated trailer according to the disclosure.

Reference is now made to FIG. 15, which is a principle drawing of an automated trailer 200, wherein the trailer 200 is provided with a trailer coupling assembly 300 utilizing the principles described above. In the embodiment of FIG. 15, the trailer coupling assembly 300 is arranged to the drawbar 210 of the trailer 200 at one side and to the connection head/trailer hitch 211 at the other side. In this embodiment, the trailer coupling assembly 300 enables movement of the connection head/trailer hitch 211 in at least the vertical direction (Z-axis) of the trailer 200.

According to a further embodiment of the trailer coupling assembly 300, it is further arranged for movement of the connection head/trailer hitch 211 in the longitudinal direction (X-axis) of the trailer 200 by comprising one or more of the intermediate connection device 310, first 320, second 330 or third 340 additional intermediate connection devices described above.

In an embodiment where the connection head/trailer hitch 211 is arranged movable in the longitudinal direction of the trailer 200, this enables the movement of the connection head/trailer hitch 211 from a secure towing position to a connection position at a distance from the trailer 200, and vice-versa. Accordingly, this allows for the connection head/trailer hitch 211 to be moved to a connection position, representing an advanced/extended position in front of the trailer 200 for connection to the tow bar 110 of the vehicle 100, and wherein the trailer 200, when connected to the tow bar 110 of the vehicle 100, may be pulled to the vehicle 100; i.e., pulling the trailer 200 towards the vehicle 100, wherein a secure coupling of the trailer 200 to the vehicle 100 is achieved.

The connection head/trailer hitch 211 may further be arranged for movement in transversal direction (Y-axis) of the trailer 200 and/or rotatable, pivotable or tiltable about transversal (Y-axis), vertical (Z-axis) or longitudinal (X-axis) axes, in this way providing the connection head/trailer hitch 211 with multiple degrees of freedom for movement enabling improved adjustability for coupling a parked trailer 200 to a vehicle 100, superior any existing prior art solution.

The spatial movement along the respective axes may be achieved by utilizing the above-described intermediate connection device 310 and, if required, one or more of the additional intermediate connection devices 320-340.

The trailer coupling assembly 300 may further utilize means 240 for moving the support means 220 in the vertical direction (along Z-axis).

The trailer coupling assembly 300 may further comprise means 500, such as an electric motor for controlled movement of the wheel 221 of the support means 220, enabling movement of the trailer 200 and thus connection head/trailer hitch 211 in the longitudinal (X-axis) and transversal (Y-axis) directions. The electrical motor 500 may also be integrated in the hub of the wheel 221 or could make use of an electric motor for moving the support means 220 in the vertical direction via transmission means.

The trailer coupling assembly 300 may further comprise means 510 for rotation of the support means 220 about the Z-axis, which, e.g., may be one or more of the additional intermediate connection devices 320-340. The means 510 for rotation may also make use of an electric motor for activating one or more additional intermediate connection devices 320-340 via transmission means.

Accordingly, by control of the support means 220 and wheel 221 thereof, approximate control of the trailer 200 and thus connection head/trailer hitch 211 relative to a tow bar 110 may be achieved. By arranging the connection head/trailer hitch 211 to the drawbar 210 via an intermediate connection device 310 and/or one or more additional intermediate connection devices 320-340, one achieves close precision control (fine adjustments) of the connection head/trailer hitch 211 relative to the tow bar 110 of the vehicle 100.

In this embodiment, it will further be preferable that the trailer 200 is provided with one or more of the above-described features for semi-automated or automated operation of trailer 200 as described with reference to FIG. 13, such as control mechanism 250 for controlling the brakes.

The trailer 200 will further be provided with proximity sensors 121, laser, laser radar, LIDAR, LADAR and/or at least one camera 120 for performing relative positioning relative to the tow bar 110 of the vehicle 100, which provides information to the trailer control unit 260 or a dedicated control unit arranged to the trailer coupling assembly 300. The trailer control unit 260 or dedicated control unit provided with means and/or software for controlling the trailer coupling assembly 300, means for controlling the support means 220 and control mechanism 250 for brakes. It will further be preferable that the trailer control unit 260 or dedicated control unit is provided with means and/or software for detection of obstacles based on information from the proximity sensors 121, laser, laser radar, LIDAR, LADAR and/or camera 120, to avoid running into obstacles between the vehicle 100 and trailer 200.

The trailer 200 or trailer coupling assembly 300 is further preferably provided with wireless communication means 600 for communication with a control device in the vehicle 100 and/or communication with a APP on a phone, tablet, computer or similar, via which activation of the trailer coupling assembly 300 may be performed for performing a connection or disconnection of the trailer 200 to/from the vehicle 100.

In an alternative embodiment, the movement of the trailer 200 may be remotely controlled via an interface on an App on a phone, tablet, computer or similar, e.g., acting as a joystick for movement of the trailer 200. This will also enable movement of the trailer 200 when it is not to be connected to a vehicle 100, or to move it to a position where it may be connected to a vehicle 100.

Accordingly, when a parked trailer 200 provided with the trailer coupling assembly 300 is to be connected to a vehicle 100, the user positions the vehicle 100 within the vicinity of the parked trailer 200. The user then activates the trailer coupling device 300 that will move the trailer 200 towards the vehicle 100 by means of semi-automated or automated control of the coupling assembly 300 that uses the at least one proximity sensor 121 and/or camera 120 and/or laser, laser radar, LIDAR or LADAR as input for guiding the trailer 200 to engagement with the tow bar 110 of the vehicle 100.

For secure coupling with the tow bar 110, the connection head/trailer hitch 211 is preferably provided with a controllable locking mechanism, as described above, which safely locks the connection to the tow bar 110.

When a trailer 200 is to be disconnected from a vehicle 100, the driver by means of the vehicle 100 is positioning the trailer 200 in vicinity of a desired parking position, wherein the trailer coupling assembly 300 is activated to perform a disconnection. The trailer coupling assembly 300 then lowers the support means 220 and activates the parking brake. The locking mechanism is next released and the trailer coupling assembly 300 moves the connection head/trailer hitch 211 out of engagement with the tow bar 110.

As described above, the trailer 200, vehicle 100 and/or trailer coupling assembly 300 may be provided with means for semi-automated or automated connection and disconnection of signals, if not wireless, safety wire or chain, if present, and connection and disconnection of pneumatic or hydraulic brakes, if present.

A vehicle 100 is provided with a trailer coupling assembly 300 according to anyone of the embodiments described above, arranged to a support structure 130 of the vehicle 100. The vehicle 100 is further provided with a propulsion system in the form of a combustion engine, electric motor or a combination of these, for propulsion of the vehicle 100 as well as providing electric energy for sensor and control systems onboard the vehicle 100.

The vehicle 100 is further provided with at least two sensors and/or sensor system, chosen among: proximity sensors 121, cameras 120, lasers, laser radars, LIDARs or LADARs, providing at least two measurements from at least two different positions at rear end of the vehicle 100 to be able to perform data triangulation.

The vehicle 100 is further comprising a control unit 150 provided with means and/or software for:
- detecting a connection head/trailer hitch 211 of a parked trailer 200 based on information from the mentioned sensors and/or sensor systems,
- semi-automated or automated backing the vehicle 100 based on relative positioning between the trailer coupling assembly 300 and the detected connection head/trailer hitch 211 of the parked trailer 200 based on information from the mentioned sensors or sensor systems, to position the hitch ball 111 within working range of the trailer coupling assembly 300,
- controlling the trailer coupling assembly 300 to achieve a connection between the connection head/trailer hitch 211 and the hitch ball 111 of the tow bar 110.

According to a further embodiment of the vehicle, the control unit 150 is provided with means and/or software for controlling the trailer coupling assembly 300 to perform a disconnection of the trailer 200 from the vehicle 100.

In accordance with a further embodiment, the vehicle 100 or trailer coupling assembly 300 and the trailer 200 are provided with wireless communication means for transfer of signals and/or wireless transfer of energy between the vehicle 100 and the trailer 200.

The above-described embodiments may be combined to form modified embodiments of the present invention within the scope of the attached claims.

The invention claimed is:

1. A trailer coupling assembly (300) connecting a support structure (130) of a vehicle (100) or a support structure (210) of a trailer (200) to a tow bar (110) or a connection head/trailer hitch (211), said trailer coupling assembly (300) comprising:
   an intermediate connection device (310) having a first end directly or indirectly coupled to the support structure (130, 210) and a second end;
   a first additional intermediate connecting device (320) having a first end coupled to the second end of the intermediate connecting device (310) and a second end coupled to the tow bar (110) or connection head/trailer hitch (211), said first additional intermediate connecting device (320) being rotatable about a horizontal axis at the second end of the intermediate connecting device (310);
   the intermediate connecting device (310) including a motor and drive controllable to move the first additional intermediate connecting device (320) and the tow bar (110) or connection head/trailer hitch (211) coupled thereto in a vertical direction relative to the vehicle (100) or trailer (200) by rotating the first end of the first additional intermediate connecting device (320) about the horizontal axis; and
   the first additional intermediate connecting device (320) including a motor and drive controllable to move the tow bar (110) or connection head/trailer hitch (211) coupled thereto in a longitudinal direction relative to the vehicle (100) or trailer (200), said first additional intermediate connecting device (320) having an elongated body (321) configured to receive one end of the tow bar (110) or connection head/trailer hitch (211), and said drive is coupled to said motor such that rotation of said drive in a first direction extends the tow bar (110) or connection head/trailer hitch (211) from the elongated body (321) and rotation of the drive in a second direction opposite the first direction retracts the tow bar (110) or connection head/trailer hitch (211) toward the elongated body (321).

2. The trailer coupling assembly of claim 1, wherein the first additional intermediate connecting device (320) includes a rotational interface (322) in the form of a linear actuator (323) comprising a worm screw coupled to the drive and in engagement with a nut (324) fixed to the tow bar (110) or connection head/trailer hitch (211).

3. The trailer coupling assembly of claim 1, comprising a second additional intermediate connection device (330) fixed to the intermediate connection device (310) or the first additional intermediate connection device (320), said second additional intermediate connection device (330) including a motor and drive controllable to rotate the tow bar (110) or connection head/trailer hitch (211) coupled thereto about the vertical axis from a towing position where the tow bar (110) or connection head/trailer hitch (211) coupled thereto are aligned with a longitudinal axis of the vehicle (100) or trailer (200) and project away from the vehicle (100) or trailer (200), to a hidden position where the tow bar (110) or connection head/trailer hitch (211) coupled thereto are beneath the support structure (130) of the vehicle (100) or the support structure (210) of the trailer (200).

4. The trailer coupling assembly of claim 3, wherein movement of the tow bar (110) or connection head/trailer hitch (211) coupled thereto between said towing and hidden positions is transverse to the longitudinal direction of the vehicle (100) or trailer (200).

5. The trailer coupling assembly of claim 1, comprising a second additional intermediate connection device (340) configured to enable movement or rotation or both of a hitch ball (111) of the tow bar (110) about a transverse axis of the tow bar (110).

6. The trailer coupling assembly of claim 1, comprising at least one electric motor (500) for controlled rotation of a wheel (221) coupled to a support leg (220) of the trailer (200), enabling movement of the trailer (200) and thus connection head/trailer hitch (211) in a longitudinal and a transverse direction.

7. The trailer coupling assembly of claim 1, wherein the connection head/trailer hitch (211) is provided with a locking mechanism for controlled attachment/detachment of a hitch ball (111) of the tow bar (110) to the connection head/trailer hitch (211).

8. The trailer coupling assembly of claim 7, wherein the locking mechanism comprises a spring-loaded locking element, movable between a locking position and connection position and biased toward the locking position, the locking element adapted to move away from the locking position to the connection position when the connection head/trailer hitch (211) engages the hitch ball (111), allowing the hitch ball (111) to be received and accommodated in the connection head/trailer hitch (211) before the spring-loaded locking element returns to the locking position, said locking mechanism further comprising an electric or manual actuator that applies a force to the spring-loaded locking element moving it into the connection position, wherein the locking element allows the hitch ball (111) to move freely out of the connection head/trailer hitch (211).

9. A vehicle (100) provided with a trailer coupling assembly (300) according to claim 1 connected to a support structure (130) of the vehicle (100), the vehicle (100) having a propulsion system in the form of a combustion engine, electric motor or both, for propulsion of the vehicle (100) and for providing energy for sensor and control systems onboard the vehicle (100), the trailer coupling assembly (300) comprising a tow bar (110) with a hitch ball (111), said vehicle (100) comprising:
   at least two sensors, sensor systems or both being selected from the group consisting of proximity sensors (121), cameras (120), lasers, laser radars, LIDARs and LADARs, configured to provide at least two measurements from at least two different positions at a rear end of the vehicle for performing data triangulation, and
   a control unit (150) configured for:
   detecting a connection head/trailer hitch (211) of a trailer (200) based on information from the sensors, sensor systems or both,
   semi-automated or automated reversing of the vehicle (100) based on relative positioning between the trailer coupling assembly (300) and the detected connection head/trailer hitch (211) of the trailer (200) based on information from the sensors, sensor systems or both, to position the hitch ball (111) within a range of the trailer coupling assembly (300), and
   controlling the trailer coupling assembly (300) to achieve a connection between the connection head/trailer hitch (211) and the hitch ball (111) of the tow bar (110).

10. The vehicle (100) according to claim 9, wherein the control unit (150) is configured for controlling the trailer coupling assembly (300) to perform a disconnection of the trailer (200) from the vehicle (100).

11. The vehicle (100) according to claim 9, wherein the vehicle (100) or trailer coupling assembly (300) and the trailer (200) are provided with wireless transfer means for wireless transfer of signals or wireless transfer of energy between the vehicle (100) and the trailer (200).

12. The vehicle (100) according to claim 9, wherein the trailer coupling assembly (300) further comprises a second additional intermediate connection device (330) fixed to the intermediate connection device (310) or the first additional intermediate connection device (320), said second additional intermediate connection device (330) including a motor and drive controllable to rotate the tow bar (110) or connection head/trailer hitch (211) coupled thereto about a vertical axis for providing additional movement of the tow bar (110) or connection head/trailer hitch (211) in a direction transverse to the longitudinal direction of the vehicle (100) or trailer (200), respectively.

13. The vehicle (100) of claim 9, wherein the trailer coupling assembly (300), further comprises a second additional intermediate connection device (340) configured to enable movement or rotation or both of a hitch ball (111) of the tow bar (110) about a transverse axis of the tow bar (110).

14. The vehicle (100) of claim 9, wherein the trailer coupling assembly (300), further comprises at least one electric motor (500) for controlled rotation of a wheel (221) coupled to a support leg (220) of the trailer (200), enabling movement of the trailer (200) and thus connection head/trailer hitch (211) in a longitudinal and a transverse direction.

15. The vehicle (100) of claim 9, wherein the connection head/trailer hitch (211) is provided with a locking mechanism for controlled attachment/detachment to the hitch ball (111) of the tow bar (110).

* * * * *